United States Patent
Teshima et al.

(10) Patent No.: US 10,833,784 B2
(45) Date of Patent: Nov. 10, 2020

(54) USER APPARATUS AND BASE STATION

(71) Applicant: NTT DOCOMO, INC., Tokyo (JP)

(72) Inventors: Kunihiko Teshima, Tokyo (JP); Tooru Uchino, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/557,493

(22) PCT Filed: Dec. 24, 2015

(86) PCT No.: PCT/JP2015/086069
§ 371 (c)(1),
(2) Date: Sep. 12, 2017

(87) PCT Pub. No.: WO2016/157657
PCT Pub. Date: Oct. 6, 2016

(65) Prior Publication Data
US 2018/0062776 A1  Mar. 1, 2018

(30) Foreign Application Priority Data

Apr. 3, 2015  (JP) .................................. 2015-077225

(51) Int. Cl.
*H04B 17/00* (2015.01)
*H04B 17/364* (2015.01)
(Continued)

(52) U.S. Cl.
CPC .......... *H04B 17/364* (2015.01); *H04W 16/14* (2013.01); *H04W 52/02* (2013.01);
(Continued)

(58) Field of Classification Search
CPC ............... H04B 17/364; H04W 16/14; H04W 56/0005; H04W 72/06; H04W 24/08
See application file for complete search history.

(56) References Cited

U.S. PATENT DOCUMENTS 7,024,194 B1 * 4/2006 Oksanen ............... H04B 7/2668
342/357.29
8,391,244 B2 * 3/2013 Choi ................. H04W 36/0088
370/332
(Continued)

FOREIGN PATENT DOCUMENTS

EP    2911462 A2    8/2015
EP    2911462 A3    11/2015
(Continued)

OTHER PUBLICATIONS

International Search Report issued in corresponding application No. PCT/JP2015/086069 dated Mar. 22, 2016 (4 pages).
(Continued)

*Primary Examiner* — April G Gonzales
(74) *Attorney, Agent, or Firm* — Osha Bergman Watanabe & Burton LLP

(57) ABSTRACT

A user apparatus communicating with a first base station and a second base station in a communication system which supports carrier aggregation is provided. The user apparatus includes a measurement unit configured to measure a timing gap between a reception timing of a first radio signal received from the first base station and a reception timing of a second radio signal received from the second base station; and a transmission unit configured to transmit the information indicating the timing gap measured by the measurement unit to the first base station or the second base station.

18 Claims, 17 Drawing Sheets

(51) Int. Cl.
  *H04W 56/00* (2009.01)
  *H04W 72/04* (2009.01)
  *H04W 52/02* (2009.01)
  *H04W 16/14* (2009.01)
  *H04W 72/06* (2009.01)
  *H04W 24/08* (2009.01)

(52) U.S. Cl.
  CPC ....... *H04W 56/00* (2013.01); *H04W 56/0005* (2013.01); *H04W 72/04* (2013.01); *H04W 72/06* (2013.01); *H04W 24/08* (2013.01)

(56) References Cited

U.S. PATENT DOCUMENTS

| | | | |
|---|---|---|---|
| 8,639,239 B2* | 1/2014 | Uemura | H04W 24/08 455/423 |
| 8,676,204 B2* | 3/2014 | Uemura | H04W 36/0083 455/436 |
| 9,002,354 B2* | 4/2015 | Krishnamurthy | H04W 72/044 455/435.1 |
| 9,125,072 B2* | 9/2015 | Ji | H04L 1/0027 |
| 9,854,506 B2* | 12/2017 | Patil | H04W 56/0015 |
| 2005/0170778 A1* | 8/2005 | Uchiyama | G06F 3/038 455/41.2 |
| 2007/0066305 A1* | 3/2007 | Deguchi | H04L 27/2601 455/436 |
| 2007/0223660 A1* | 9/2007 | Dei | G10L 19/24 379/88.13 |
| 2008/0189970 A1* | 8/2008 | Wang | H04W 36/0055 33/701 |
| 2010/0003979 A1* | 1/2010 | Iwamura | H04B 17/309 455/436 |
| 2011/0237202 A1* | 9/2011 | Uemura | H04W 24/08 455/67.14 |
| 2011/0268435 A1* | 11/2011 | Mizutani | H04Q 11/0067 398/5 |
| 2012/0051329 A1* | 3/2012 | Hirano | H04W 36/0088 370/332 |
| 2012/0052814 A1* | 3/2012 | Gerber | H04W 52/0209 455/67.11 |
| 2012/0300701 A1* | 11/2012 | Uemura | H04L 5/0082 370/328 |
| 2012/0302174 A1* | 11/2012 | Watanabe | H04W 36/0085 455/67.11 |
| 2013/0250925 A1* | 9/2013 | Lohr | H04W 56/0045 370/336 |
| 2014/0029586 A1* | 1/2014 | Loehr | H04B 3/36 370/336 |
| 2015/0016282 A1* | 1/2015 | Su | H04W 36/0088 370/252 |
| 2015/0189574 A1* | 7/2015 | Ng | H04W 24/08 370/252 |
| 2015/0201338 A1* | 7/2015 | Gopal | H04W 36/0088 370/252 |
| 2015/0201383 A1* | 7/2015 | Papasakellariou | H04W 52/146 370/278 |
| 2015/0208366 A1* | 7/2015 | Papasakellariou | H04W 52/34 370/311 |
| 2015/0223089 A1* | 8/2015 | Chakraborty | H04W 24/08 370/252 |
| 2015/0358099 A1 | 12/2015 | Fujishiro et al. | |
| 2016/0165559 A1 | 6/2016 | Nagata et al. | |

FOREIGN PATENT DOCUMENTS

| | | |
|---|---|---|
| JP | 2002524967 A | 8/2002 |
| JP | 2013021497 A | 1/2013 |
| JP | 2014-511640 A | 5/2014 |
| WO | 2012119626 A1 | 9/2012 |
| WO | 2014/098187 A1 | 6/2014 |
| WO | 2015/008749 A1 | 1/2015 |
| WO | 2015099495 A1 | 7/2015 |

OTHER PUBLICATIONS

Written Opinion of the International Searching Authority issued in corresponding application No. PCT/JP2015/086069 dated Mar. 22, 2016 (4 pages).
Intel Corporation, "Discussion on SFN timing difference in Dual connectivity"; 3GPP TSG-RAN WG4 Meeting #71, R4-143028; Seoul, Korea; May 19-23, 2014 (7 pages).
Samsung, "Measurement gap handling in SeNB in asynchronuous deployments"; 3GPP TSG-RAN WG2 Meeting #87, R2-143080; Dresden, Germany; Aug. 18-22, 2014 (3 pages).
3GPP TS 36.300 V12.4.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).
3GPP TS 36.331 V12.5.0, "3rd Generation Partnership Project; Technical Specification Group Radio Access Network; Evolved Universal Terrestrial Radio Access (E-UTRA); Radio Resource Control (RRC); Protocol specification (Release 12)"; Mar. 2015 (445 pages).
Office Action issued in the counterpart Canadian Patent Application No. 2,971,087, dated Apr. 18, 2018 (8 pages).
Office Action issued in counterpart Japanese Patent Application No. 2017-509179, dated Jul. 10, 2018 (5 Pages).
Extended European Search Report issued in corresponding European Application No. 15887799.3, dated Mar. 15, 2018 (12 pages).
Office Action issued in the counterpart Japanese Patent Application No. 2017509179, dated Mar. 5, 2019 (5 pages).
Notice of Reasons for Refusal issued in Japanese Application No. 2017-509179, dated Jan. 14, 2020 (8 pages).

* cited by examiner

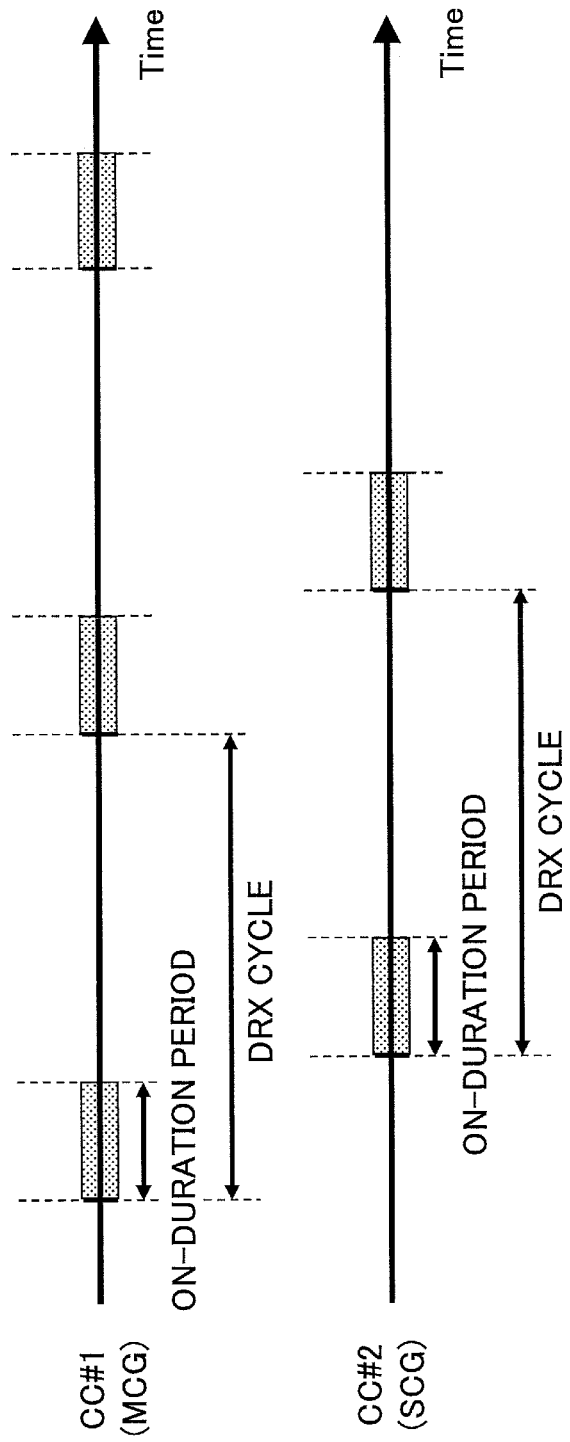

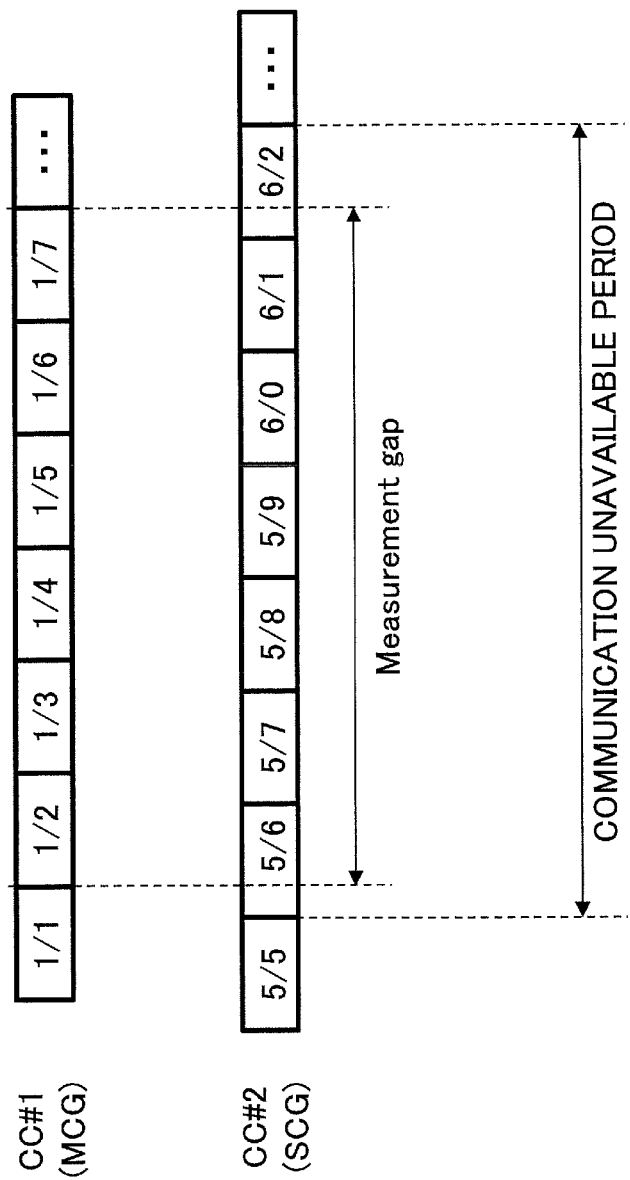

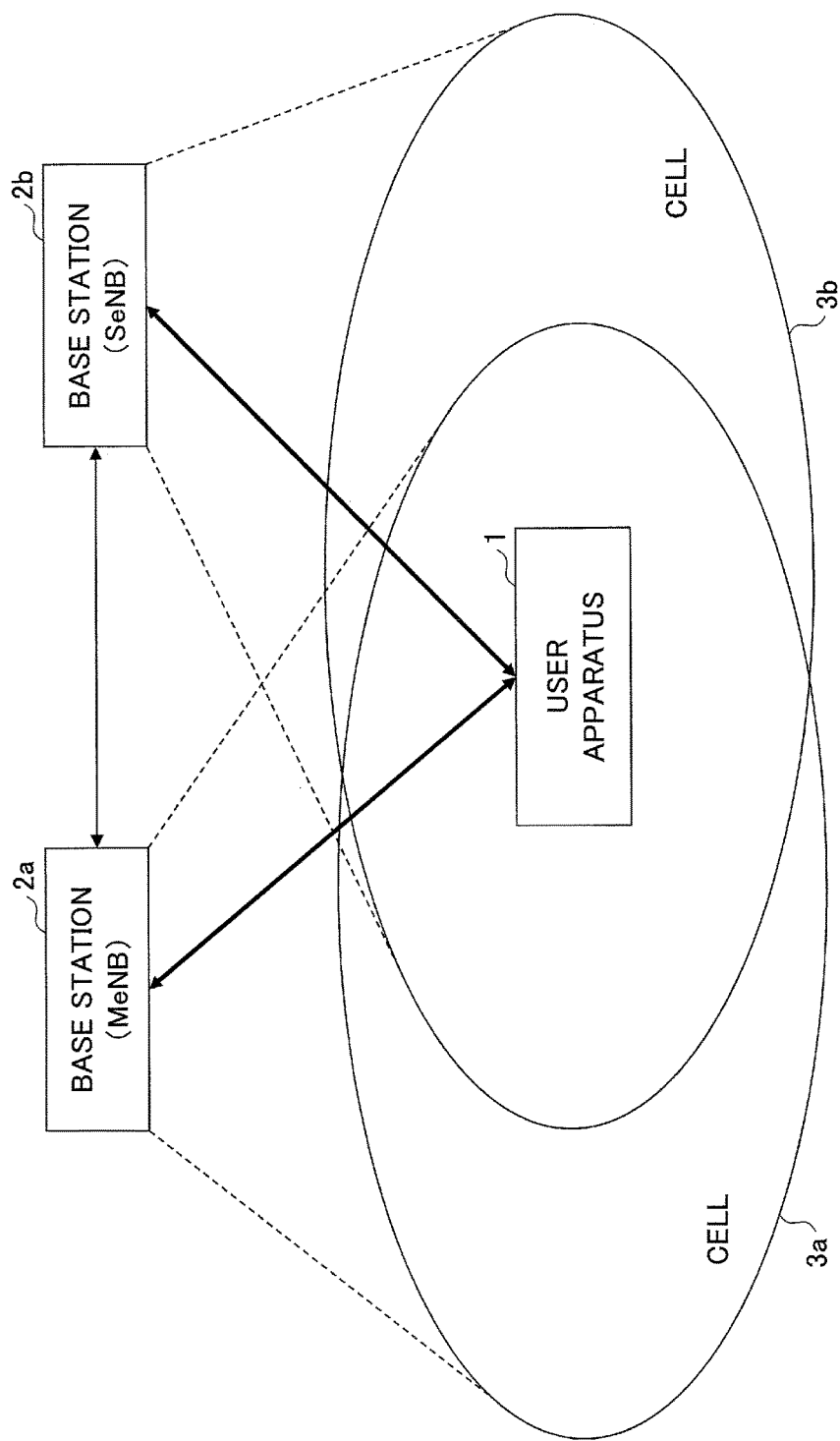

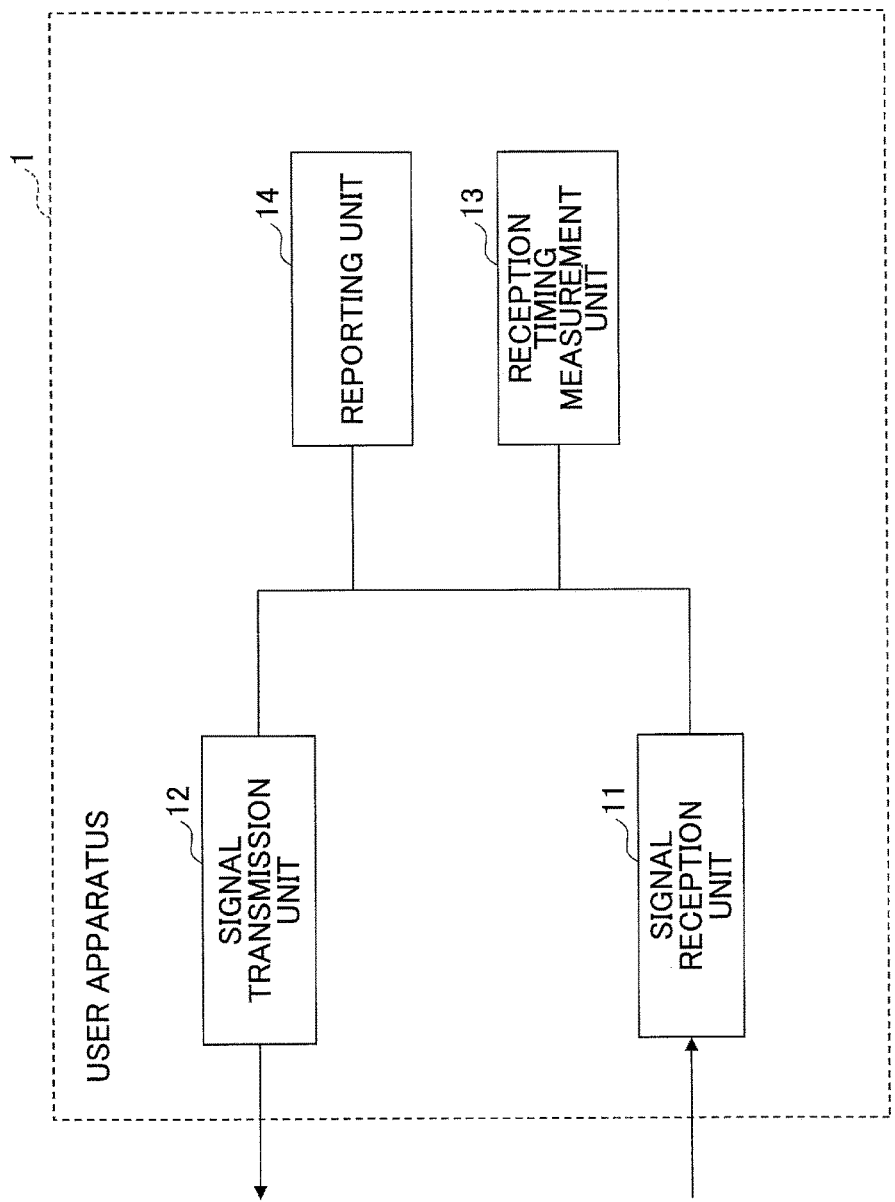

USER APPARATUS AND BASE STATION

BACKGROUND OF THE INVENTION

1. Field of the Invention

The present invention relates to a user apparatus and a base station.

2. Description of the Related Art

Carrier aggregation (CA) is adopted in a long term evolution (LTE) system. In CA, communications are performed by having a predetermined bandwidth as a basic unit (maximum 20 MHz), and by using a plurality of carriers simultaneously. The carrier as a basic unit in the carrier aggregation is referred to as a component carrier (CC).

When CA is performed, a primary cell (PCell) with high reliability for securing connectivity and a secondary cell (SCell) are set (configured) for a user apparatus. First, the user apparatus is connected to a PCell, and then, if necessary, an SCell can be added.

The SCell is a cell set for the user apparatus in addition to the PCell. Addition and removal of the SCell are performed by using radio resource control (RRC) signaling.

As illustrated in FIG. 1, in CA of LTE Rel-10, a plurality of CCs under the same base station are used. Further, in CA of Rel-10, a high-speed data rate is achieved by using wider bandwidth by bundling maximum five CCs.

On the other hand, in Rel-12, dual connectivity (hereinafter, referred to as "DC") has been proposed in which simultaneous communications are performed to realize high throughput by using CCs under different base stations. In other words, in DC, a user apparatus performs communications by simultaneously using radio resources of two physically different base stations.

DC is a kind of CA, and is also referred to as Inter eNB CA (inter-base-station carrier aggregation). In DC, a master-eNB (MeNB) and a secondary-eNB (SeNB) are introduced. FIG. 2 illustrates an example of DC. In an example of FIG. 2, an MeNB communicates with the user apparatus via CC#1, an SeNB communicates with the user apparatus via CC#2, and thus, DC is realized.

In DC, a cell group including (one or multiple) cells under the MeNB is referred to as a master cell group (MCG), and a cell group including (one or multiple) cells under the SeNB is referred to as a secondary cell group (SCG). UL CCs are set in one or more SCells of the SCG, in one of which CCs a physical uplink control channel (PUCCH) is set. The SCell described above is referred to as a primary SCell (PSCell).

CITATION LIST

Non-Patent Literature

[NPL 1] 3GPP TS 36.300 V12.4.0 (2014-December)
[NPL 2] 3GPP TS 36.331 V12.5.0 (2015-March)

SUMMARY OF THE INVENTION

Technical Problem

In non-DC-type CA, CCs are included in the same base station, and thus, a system frame number (SFN), a subframe number, and a transmission timing are synchronized among the CCs.

On the other hand, in DC, CCs are included in multiple base stations (MeNB, SeNB). Therefore, there is a case in which the SFN, the subframe number, and the transmission timing are not synchronized between the CCs that belong to the MCG and the CCs that belong to the SCG. FIG. 3A illustrates a state in which the SFN, the subframe number, and the transmission timing are synchronized between CC#1 and CC#2. FIG. 3B illustrates a state in which the SFN, the subframe number, and the transmission timing are not synchronized between CC#1 and CC#2.

Here, in order to reduce energy consumption of a user apparatus, a mechanism called discontinuous reception (DRX) is defined in LTE. According to the DRX control, the user apparatus in an RRC connected state is allowed to perform physical downlink control channel (PDCCH) reception during only an on-duration period, and stop processing of a radio frequency (RF) unit during a period other than the on-duration period.

A DRX control operation is performed by each user apparatus for each base station, independently. In other words, in the case where DC-type CA is performed, the user apparatus receives an instruction indicating an on-duration period and a start timing of the on-duration period from the base station included in the MCG (MeNB) and the base station included in the SCG (SeNB).

FIG. 4 is a drawing illustrating a problem in the DRX control operation. It is assumed that the user apparatus performs CA in which CC#1 belonging to the MCG and CC#2 belonging to the SCG are bundled. As illustrated in FIG. 4, the on-duration period for CC#1 and the start timing of the on-duration period for CC#1 are transmitted to the user apparatus from one base station independently from the on-duration period for CC#2 and the start timing of the on-duration period for CC#2 transmitted to the user apparatus from the other base station, and thus, the time during which an RF unit of the user apparatus operates becomes longer.

In the typical user apparatus, it is often the case that an RF unit used for CCs belonging to the MCG and an RF unit used for CCs belonging to the SCG are implemented by partially shared common parts. Therefore, the energy consumption of the user apparatus can be reduced more effectively by stopping the RF units at the same time rather than by stopping the RF units independently.

However, because the DRX control operation is performed by each user apparatus for each base station, independently, it is not possible to align the on-duration period of CC#1 with the on-duration period of CC#2 in order to stop the RF units at the same time, which is a problem.

Further, in LTE, in order to cause the user apparatus to be connected to a cell with better radio quality, or in order to perform inter-cell load balancing, the user apparatus measures radio quality of the cells. In the case of measuring radio quality of a cell whose frequency is different from the frequency used for communications, the user apparatus stops downlink (DL) and uplink (UL) communications in order to switch the frequency of the RF unit. A time period when the communications are stopped is referred to as "measurement gap".

The period and a timing which define the measurement gap (which are specified by a gap pattern and a gap offset) are determined by the base station and transmitted to the user apparatus. Further, the base station stops DL and UL scheduling for the user apparatus during the time corresponding to the measurement gap and does not allocate radio resources wastefully during the time zone when the user apparatus stops communications.

It should be noted that, in the case where CA is performed, the base station sets the period and the timing for the measurement gap at the same timing for all CCs. On the other hand, in the case where DC-type CA is performed, the base station included in the MCG (MeNB) sets the period and the timing of the measurement gap.

FIG. 5 is a drawing illustrating a problem in controlling the measurement gap. It is assumed that the user apparatus performs CA in which CC#1 belonging to the MCG and CC#2 belonging to the SCG are bundled. As described above, during the time when the measurement gap is set, the user apparatus stops DL and UL communications in order to switch the frequency of the RF unit. In other words, during the time when the measurement gap is set, the user apparatus stops not only communications using CC#1 but also communications using CC#2. As illustrated in FIG. 5, in the case where the subframes are not synchronized between CC#1 and CC#2, the user apparatus cannot perform DL and UL communications of the subframes of CC#2 in a period indicated by "communication unavailable period".

However, if the base station included in the SCG (SeNB) is not aware of the "communication unavailable period", then the base station performs DL and UL scheduling for the user apparatus by using CC#2. In other words, there is a problem in that radio resources are wastefully allocated in spite of the fact that the user apparatus is in a communication unavailable state.

According to the specifications of LTE Rel-12, it is assumed that, in DC, among the base stations corresponding to CCs (MeNB, SeNB), information related to SFNs, subframe numbers, and transmission timing differences is shared by each other via operation and management (OAM), etc. It is expected that the problem described above will be solved by sharing the information among the base stations.

However, in reality, in the case where the vendors of the base stations corresponding to the CCs are different, it is difficult to share the information among the base stations because of a reason such as the OAM interface is not uniform, etc.

In view of the above, an object of the present invention is to provide a technique in which the user apparatus detects the gap of the subframes of radio signals transmitted from multiple base stations, and transmits the detected gap to the base stations.

Solution to Problem

A user apparatus according to an embodiment communicating with a first base station and a second base station in a communication system which supports carrier aggregation is provided. The user apparatus included a measurement unit configured to measure a timing gap between a reception timing of a first radio signal received from the first base station and a reception timing of a second radio signal received from the second base station; and a transmission unit configured to transmit the information indicating the timing gap measured by the measurement unit to the first base station or the second base station.

Further, a base station according to an embodiment communicating with a user apparatus in a communication system which supports carrier aggregation is provided. The base station includes a reception unit configured to receive information indicating a timing gap between a reception timing of a first radio signal transmitted from the base station and a reception timing of a second radio signal transmitted from another base station different from the base station; and a control unit configured to control the user apparatus based on the information indicating the timing gap.

Advantageous Effects of Invention

According to an embodiment of the present invention, a technique is provided in which the user apparatus detects the gap of the subframes of radio signals transmitted from multiple base stations, and transmits the detected gap to the base stations.

BRIEF DESCRIPTION OF THE DRAWINGS

FIG. 4 is a drawing illustrating a problem in the DRX control operation.

FIG. 5 is a drawing illustrating a problem in controlling the measurement gap.

FIG. 6 is a drawing illustrating a structure of a communication system according to an embodiment.

FIG. 7 is a drawing illustrating an example of a functional structure of a user apparatus according to an embodiment.

DETAILED DESCRIPTION OF THE PREFERRED EMBODIMENTS

Figure 1:
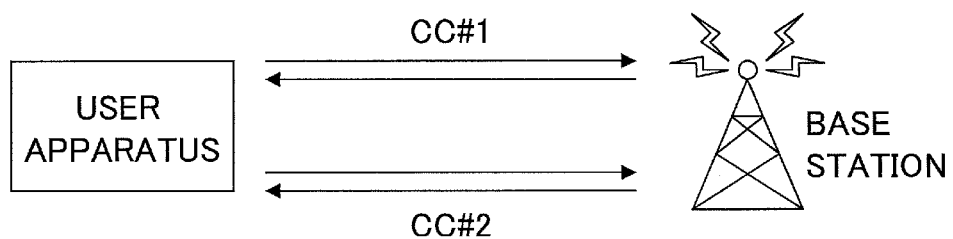
FIG. 1 is a drawing illustrating CA of LTE Rel-10.
Figure 2:
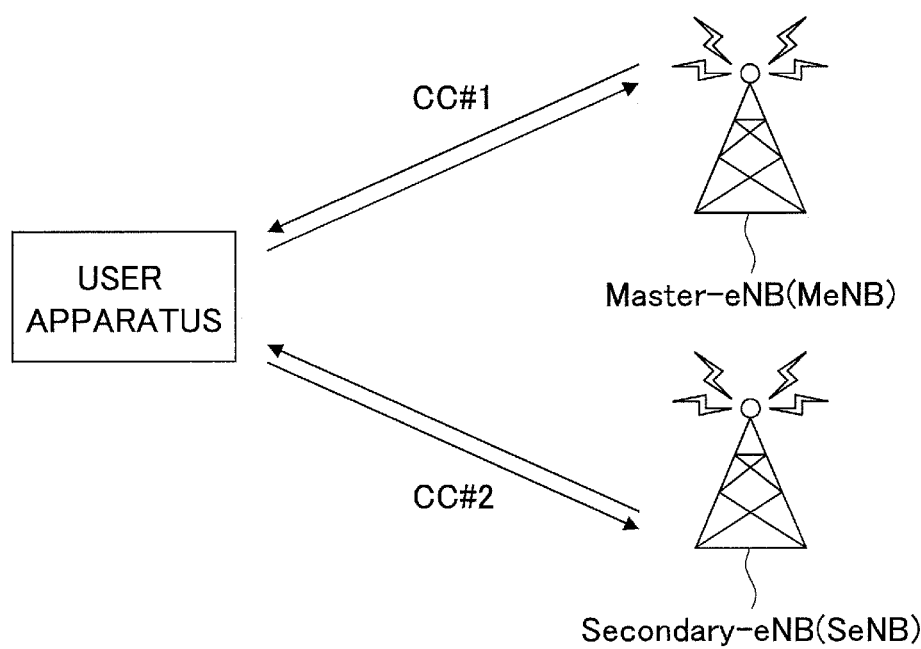
FIG. 2 is a drawing illustrating an example of dual connectivity introduced in Rel-12.
Figure 3A:
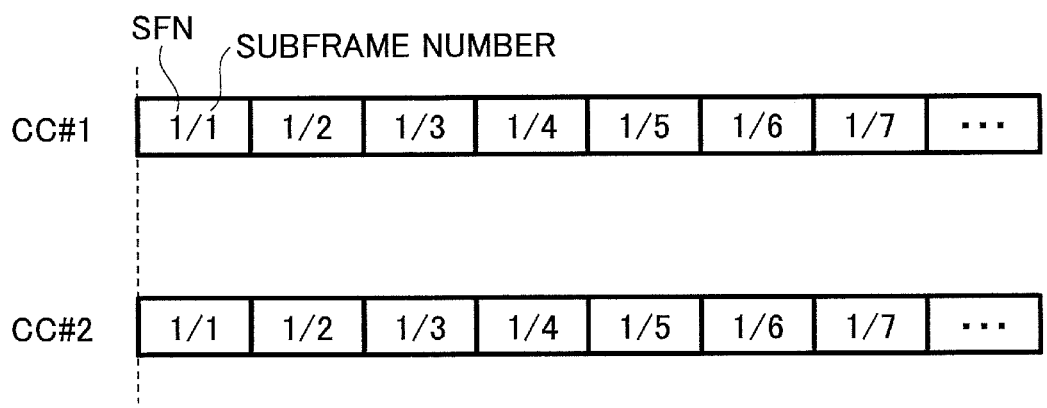
FIG. 3A is a drawing illustrating a state of synchronization of CCs.
Figure 3B:
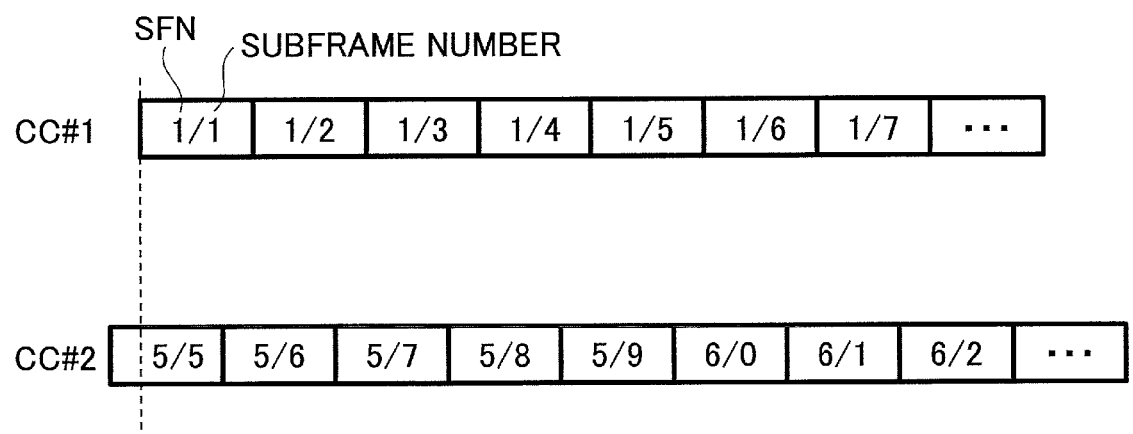
FIG. 3B is a drawing illustrating a state of synchronization of CCs.

In the following, referring to the drawings, embodiments of the present invention will be described. It should be noted that the embodiments described below are merely examples and the embodiments to which the present invention is applied are not limited to the following embodiments. In an embodiment, a target is an LTE mobile communication system. However, an embodiment is not limited to LTE, and can be applied to other mobile communication systems. Further, in an embodiment, it is assumed as a prerequisite in the description that a carrier aggregation technology is introduced in the mobile communication system. The embodiment is not limited to it.

It should be noted that, in the application specification and claims, the term "LTE" is used, not only for meaning a communication method corresponding to 3GPP release 8 or 9, but also for including a communication method corresponding to 3GPP release 10, 11, 12, 14, or later.

<Overall System Configuration>

FIG. 6 is a drawing illustrating a structure of a communication system according to an embodiment. As illustrated in FIG. 6, the communication system according to an embodiment includes a user apparatus 1, a base station 2*a* included in a MCG (MeNB), and a base station 2*b* included in a SCG (SeNB). The base station 2*a* and the base station 2*b* are included in DC-type CA. It is possible for the user apparatus to perform CA communications with the base station 2*a* and the base station 2*b*.

Further, the base station 2*a* corresponds to a cell 3*a* (PCell), and the base station 2*b* corresponds to a cell 3*b* (PSCell). Each of the cells (3*a*, 3*b*) includes, for example, a CC, or a set of a downlink CC and an uplink CC, but, in the following, it may be considered that a cell has the same meaning as a CC. Further, in FIG. 6, it is illustrated for the sake of convenience that the base station 2*a* and the base station 2*b* correspond to the cell 3*a* and the cell 3*b*, respectively. The base station 2*a* and the base station 2*b* may further include other cells (SCell), respectively.

It should be noted that, in the following, the base station 2*a* and the base station 2*b* may be collectively described as the base station 2. Further, the cell 3*a* and the cell 3*b* may be collectively described as the cell 3.

The user apparatus 1 has a function for communicating with the base station 2, the core network, etc., via radio. The user apparatus 1 may be, for example, a mobile phone, a smartphone, a tablet, a mobile router, a wearable terminal, etc. The user apparatus 1 may be any apparatus as long as it has a communication function. The user apparatus 1 includes hardware resources such as a CPU including a processor, a memory apparatus including a ROM, a RAM, a flash memory, etc., an antenna used for communications with the base station 2, a radio frequency (RF) apparatus, etc. Functions and processes of the user apparatus 1 may be realized by having the processor processing data or executing programs stored in the memory apparatus. However, the hardware configuration of the user apparatus 1 is not limited to the above, and the user apparatus 1 may have any other appropriate hardware configuration.

The base station 2 performs communications with the user apparatus 1 via radio. The base station 2 includes hardware resources such as a CPU including a processor, a memory apparatus including a ROM, a RAM, a flash memory, etc., an antenna used for communications with the user apparatus 1, etc., a communication interface apparatus for communicating with an adjacent base station 2, a core network, etc. Functions and processes of the base station 2 may be realized by having the processor processing data or executing programs stored in the memory apparatus. However, the hardware configuration of the base station 2 is not limited to the above, and the base station 2 may have any other appropriate hardware configuration.

In a communication system according to an embodiment, the user apparatus 1 measures a subframe gap of radio signals received from the base station 2*a* and the base station 2*b*, and reports the measured subframe gap to the base station 2*a* and/or the base station 2*b*. Further, the base station 2*a* and the base station 2*b* perform scheduling control operations taking into account DRX control operations and the measurement gap based on the subframe gap reported by the user apparatus 1.

<Functional Structure>

(User Apparatus)

FIG. 7 is a drawing illustrating an example of a functional structure of a user apparatus 1 according to an embodiment. As illustrated in FIG. 7, the user apparatus 1 includes a signal reception unit 11, a signal transmission unit 12, a reception timing measurement unit 13, and a reporting unit 14. FIG. 7 illustrates functional units of the user apparatus 1 especially related to an embodiment only, and thus, the user apparatus 1 further includes at least functions for performing operations according to LTE (not shown in the figure). Further, a functional structure illustrated in FIG. 7 is merely an example. Functional classification and names of functional units may be anything as long as operations related to an embodiment can be performed.

The signal reception unit 11 includes a function for wirelessly receiving various kinds of signals from the base station 2, and obtaining upper layer signals from the received physical layer signals. The signal transmission unit 12 includes a function for wirelessly transmitting various kinds of physical layer signals generated from an upper layer signal which should be transmitted from the user apparatus 1. Further, each of the signal reception unit 11 and the signal transmission unit 12 includes a function for performing CA in which multiple CCs are bundled for communications. It is assumed that each of the signal reception unit 11 and the signal transmission unit 12 includes a packet buffer, and performs processes of layer 1 (PHY) and layer 2 (MAC, RLC, PDCP). However, the functional structure is not limited to the above.

Further, the signal reception unit 11 recognizes a reception timing (symbol timing), an SFN, and a subframe number of each of radio signals transmitted from the base station 2*a* and the base station 2*b* based on synchronization signals (PSS, SSS) transmitted from the base station 2*a* and a master information block (MIB) included in a physical broadcast channel (PBCH), etc.

The reception timing measurement unit 13 measures the reception timing gap between a radio signal transmitted from the base station 2*a* and a radio signal transmitted from the base station 2*b* by comparing a reception timing (symbol timing), an SFN, and a subframe number of the radio signal transmitted from the base station 2*a* and a reception timing (symbol timing), an SFN, and a subframe number of the radio signal transmitted from the base station 2*b*.

The reporting unit 14 transmits (reports) information indicating the reception timing gap measured by the reception timing measurement unit 13 (hereinafter, referred to as "reception timing information") to the base station 2*a* and/or the base station 2*b* via the signal transmission unit 12.

(Base Station)

Figure 8:
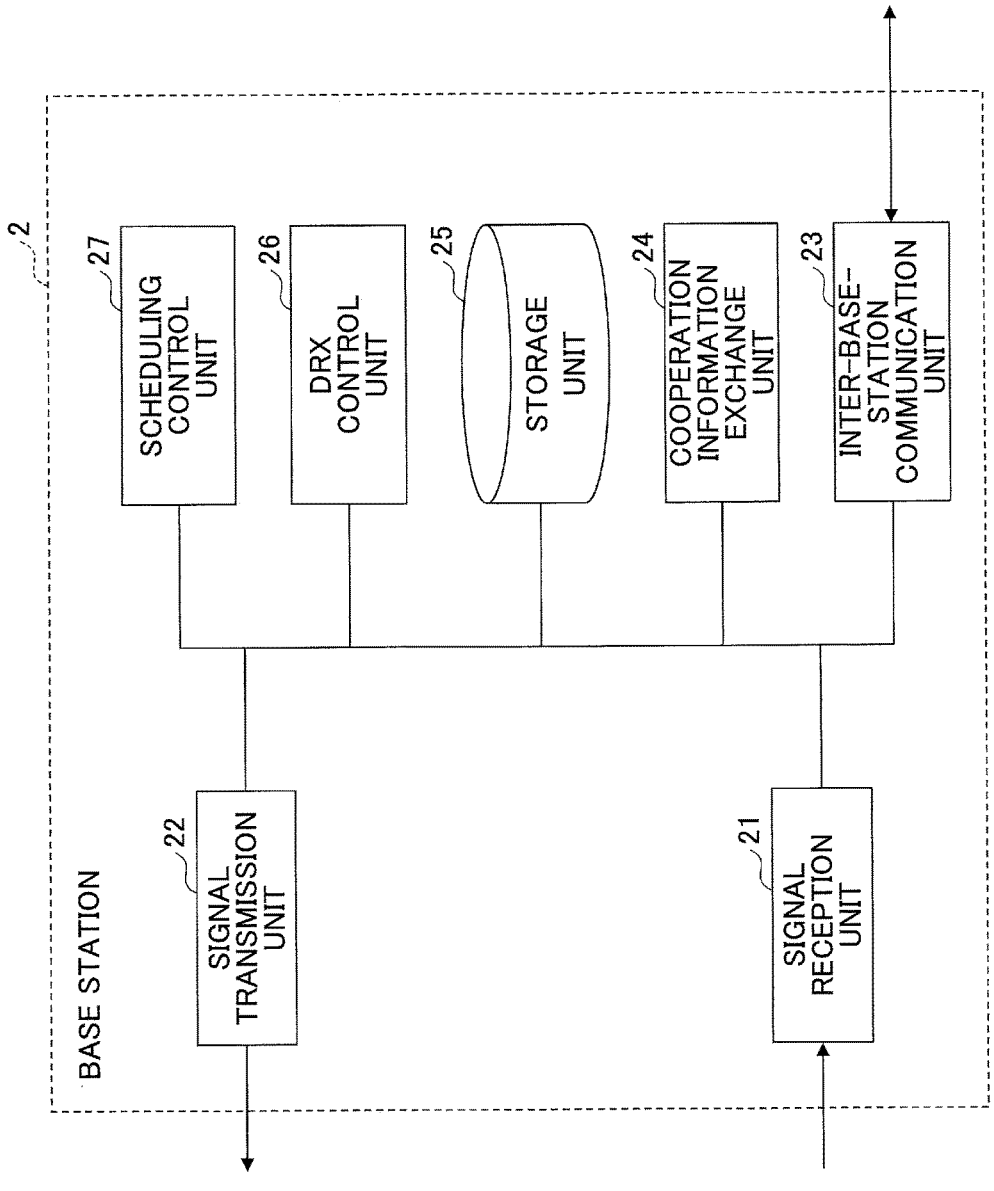
FIG. 8 is a drawing illustrating an example of a functional structure of a base station according to an embodiment.

FIG. 8 is a drawing illustrating an example of a functional configuration of a base station 2 according to an embodiment. As illustrated in FIG. 8, the base station 2 includes a signal reception unit 21, a signal transmission unit 22, an inter-base-station communication unit 23, a cooperation information exchange unit 24, a storage unit 25, a DRX control unit 26, and a scheduling control unit 27. FIG. 8 illustrates functional units of the base station 2 especially related to an embodiment only, and thus, the base station 2 further includes at least functions for performing operations according to LTE (not shown in the figure). Further, a functional structure illustrated in FIG. 8 is merely an example. Functional classification and names of functional units may be anything as long as operations related to an embodiment can be performed.

The signal reception unit 21 includes a function for wirelessly receiving various kinds of signals from the user apparatus 1, and obtaining upper layer signals from the received physical layer signals. The signal transmission unit 22 includes a function for wirelessly transmitting various kinds of physical layer signals generated from an upper layer signal which should be transmitted from the base station 2. Each of the signal reception unit 21 and the signal transmission unit 22 includes a function for performing CA in which multiple CCs are bundled for communications.

It is assumed that each of the signal reception unit 21 and the signal transmission unit 22 includes a packet buffer, and performs processes of layer 1 (PHY) and layer 2 (MAC, RLC, PDCP). However, the functional structure is not limited to the above.

The inter-base-station communication unit 23 performs communications with another base station. Further, the inter-base-station communication unit 23 may include a function for processing a signal transmitted and received via an X2 interface.

The cooperation information exchange unit 24 receives reception timing information from the user apparatus 1, and, exchange information used for cooperatively performing scheduling control operations taking into account the DRX control operation and the measurement gap (hereinafter referred to as "cooperation information") with the other base station based on the reception timing information. Further, the cooperation information exchange unit 2 stores the cooperation information exchanged with the other base station in the storage unit 25.

The storage unit 25 is used for storing the cooperation information. It should be noted that the cooperation information is different for each user apparatus 1. The cooperation information includes, for example, information used for aligning the on-duration periods between the base stations 2 in the DRX control operation, and information related to a period and a timing used for providing the measurement gap by the MeNB.

The DRX control unit 26 transmits to the user apparatus 1 an instruction indicating the on-duration period and the start timing of the on-duration period based on the reception timing information and/or the cooperation information stored in the storage unit 25.

The scheduling control unit 27 performs scheduling in such a way that the DL and UL radio resources of subframes corresponding to the period of the measurement gap are not allocated based on the reception timing information and/or the cooperation information stored in the storage unit 25.

The above-described functional structures of the user apparatus 1 and the base station 2 may be entirely realized by a hardware circuit (e.g., one or more IC chips), or may be partially realized by a hardware circuit and the remaining part may be realized by a CPU and programs.

Figure 9:
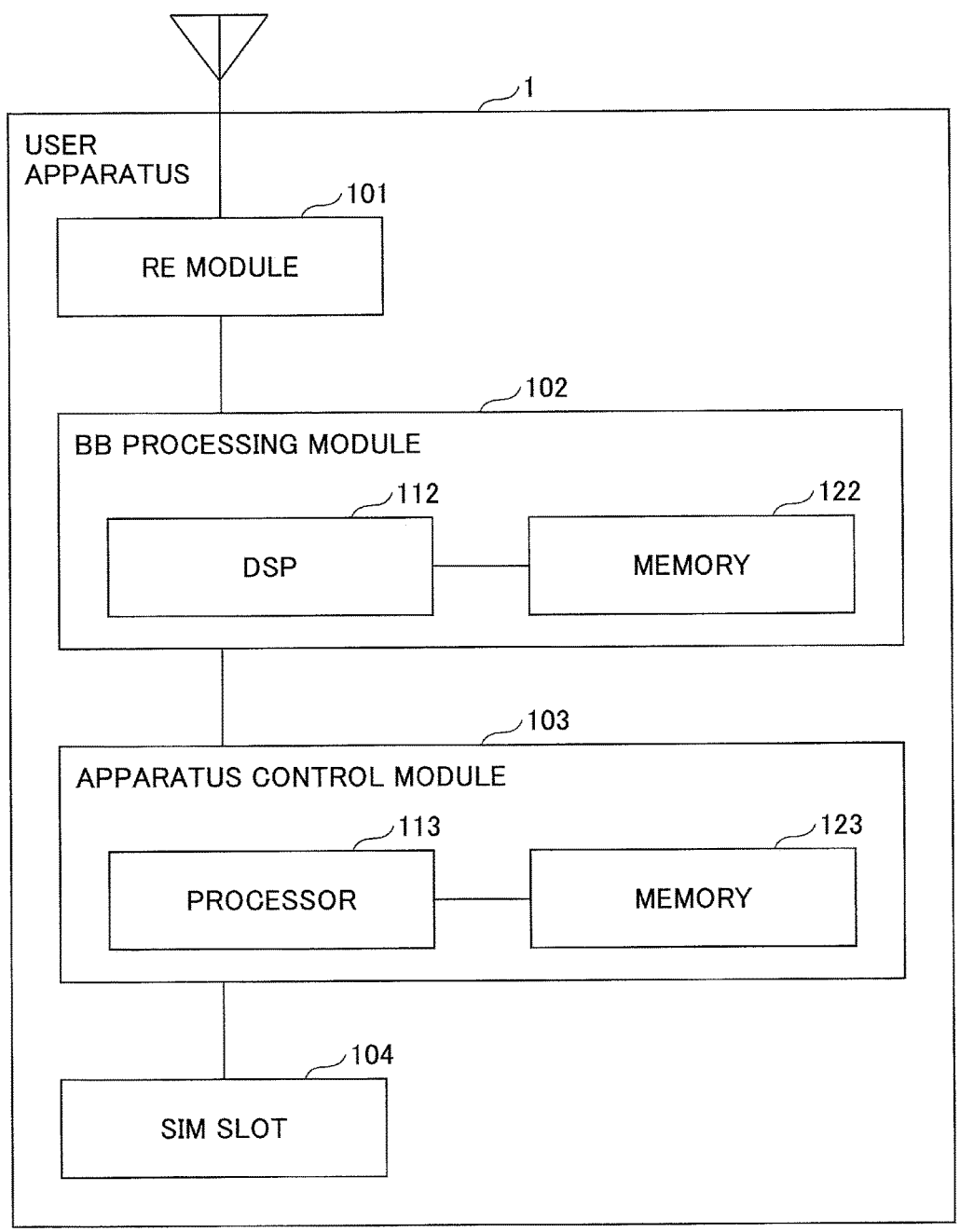
FIG. 9 is a drawing illustrating an example of a hardware configuration of a user apparatus according to an embodiment.

FIG. 9 is a drawing illustrating an example of a hardware configuration of a user apparatus 1 according to an embodiment. FIG. 9 illustrates a structure closer to an implementation example compared to FIG. 7. As illustrated in FIG. 9, the user apparatus 1 includes a radio equipment (RE) module 101 for performing a process related to a radio signal, a base band (BB) processing module 102 for performing baseband signal processing, an apparatus control module 103 for performing a process of an upper layer, etc., and a SIM slot 104 which is an interface used for accessing a SIM card.

The RF module 101 generates a radio signal to be transmitted from an antenna by performing digital-to-analog (D/A) conversion, modulation, frequency conversion, power amplification, etc., for a digital baseband signal received from the BB processing module 102. Further, the RF module 101 generates a digital baseband signal by performing frequency conversion, analog to digital (A/D) conversion, demodulation, etc., for a received radio signal, and transmits the generated signal to the BB processing module 102. The RF module 101 includes, for example, a part of the signal reception unit 11 and a part of the signal transmission unit 12 illustrated in FIG. 7.

The BB processing module 102 performs a process of converting bidirectionally between an IP packet and a digital baseband signal. A digital signal processor (DSP) 112 is a processor for performing signal processing in the BB processing module 102. A memory 122 is used as a work area of the DSP 112. The RF module 102 includes, for example, a part of the signal reception unit 11, a part of the signal transmission unit 12, and the reception timing measurement unit 13 illustrated in FIG. 7.

The apparatus control module 103 performs an IP layer protocol process, processes of various types of applications, etc. A processor 113 performs a process for the apparatus control module 103. A memory 123 is used as a work area of the processor 113. Further, the processor 113 writes and reads data to and from a SIM via the SIM slot 104. The apparatus control module 103 includes, for example, the reporting unit 14 illustrated in FIG. 7.

Figure 10:
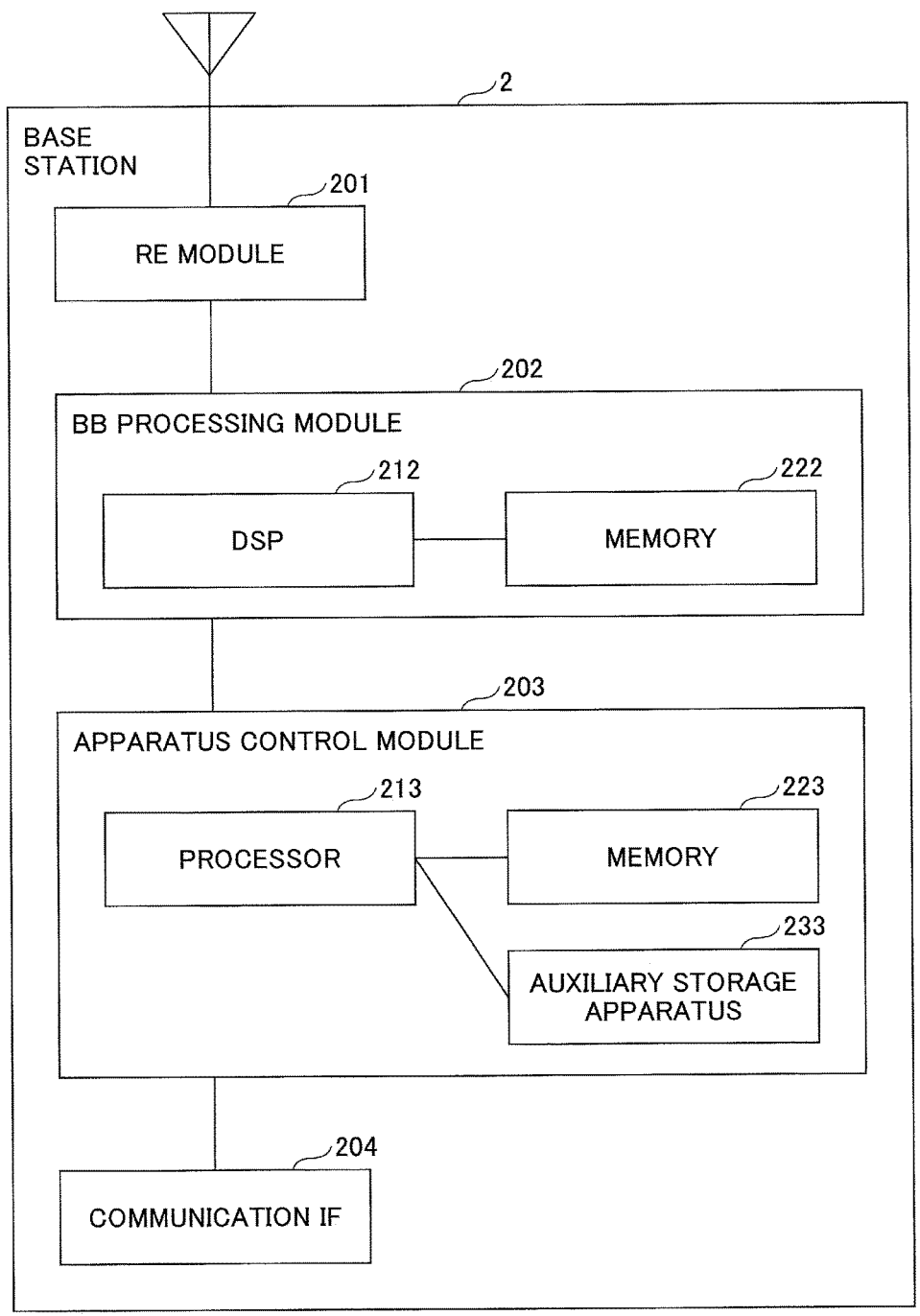
FIG. 10 is a drawing illustrating an example of a hardware configuration of a base station according to an embodiment.

FIG. 10 is a drawing illustrating an example of a hardware configuration of a base station 2 according to an embodiment. FIG. 10 illustrates a structure closer to an implementation example compared to FIG. 8. As illustrated in FIG. 10, the base station 2 includes an RE module 201 for performing a process related to a radio signal, a BB processing module 202 for performing baseband signal processing, an apparatus control module 203 for performing a process of an upper layer, etc., and a communication IF 204 as an interface for connecting to a network.

The RE module 201 generates a radio signal to be transmitted from an antenna by performing D/A conversion, modulation, frequency conversion, power amplification, etc., for a digital baseband signal received from the BB processing module 202. Further, the RE module 161 generates a digital baseband signal by performing frequency conversion, A/D conversion, demodulation, etc., for a received radio signal, and transmits the generated signal to the BB processing module 202. The RF module 401 includes, for example, a part of the signal reception unit 21 and a part of the signal transmission unit 22 illustrated in FIG. 8.

The BB processing module 202 performs a process of converting bidirectionally between an IP packet and a digital baseband signal. A DSP 212 is a processor for performing signal processing in the BB processing module 202. A memory 222 is used as a work area of the DSP 212. The BB processing module 202 includes, for example, a part of the signal reception unit 21, a part of the signal transmission unit 22, the storage unit 25, the DRX control unit 26, and the scheduling control unit 27 illustrated in FIG. 8.

The apparatus control module 203 performs an IP layer protocol process, an operation and maintenance (OAM)

process, etc. A processor 213 performs a process for the apparatus control module 203. A memory 223 is used as a work area of the processor 213. An auxiliary storage apparatus 233 is, for example, a HDD, etc., and stores various types of setting information items, etc., used for operations of the base station 2. The apparatus control module 203 includes, for example, the cooperation information exchange unit 24 illustrated in FIG. 8. The communication IF 204 includes, for example, the inter-base-station communication unit 23.

<Processing Steps>

(Processing Sequence)

Figure 11:
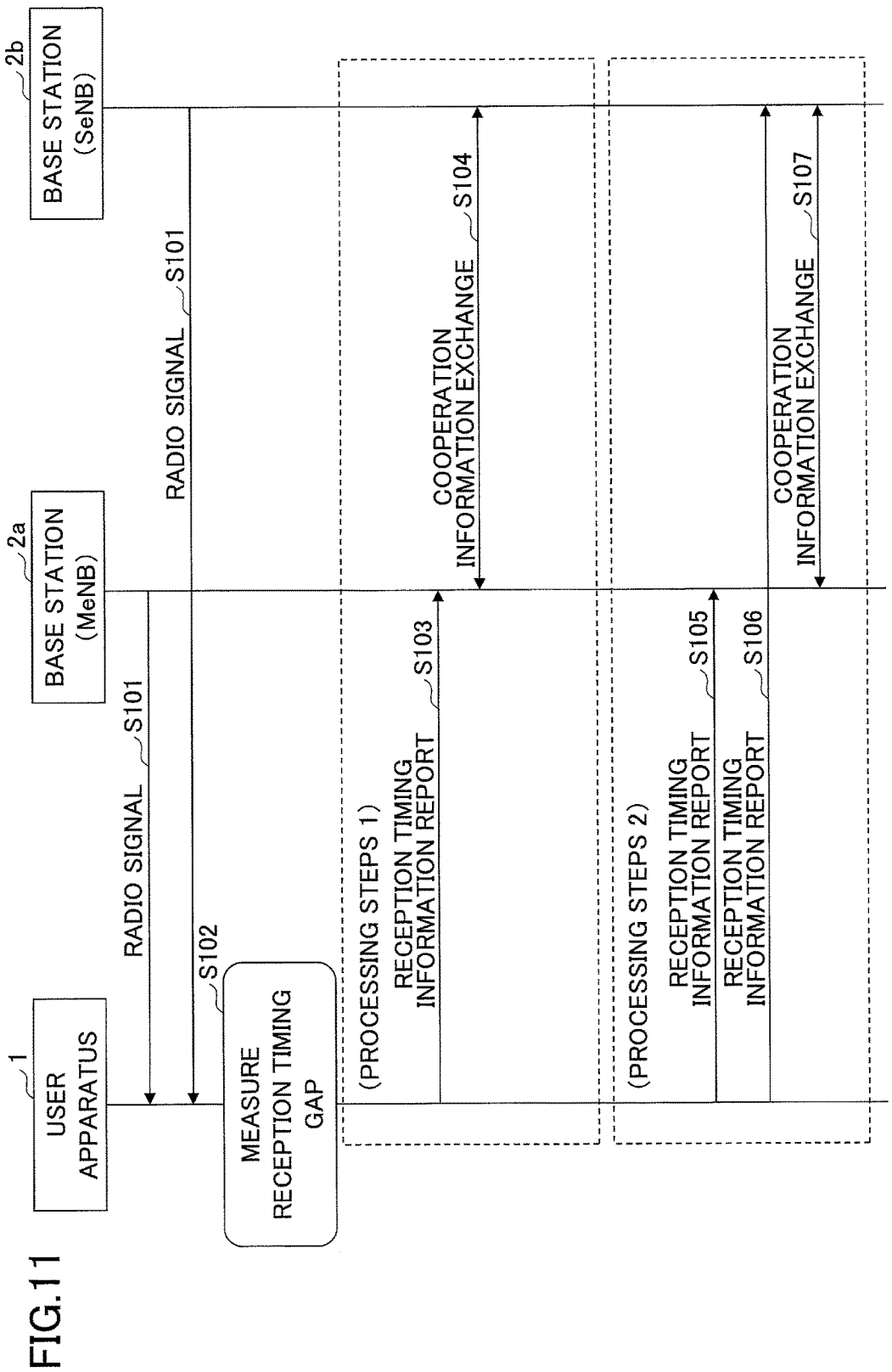
FIG. 11 is a sequence diagram illustrating an example of processing steps of a communication system according to an embodiment.

FIG. 11 is a sequence diagram illustrating an example of processing steps of a communication system according to an embodiment.

Referring to FIG. 11, processing steps will be described in which the user apparatus 1 measures a reception timing gap between the radio signals transmitted from the base station 2a and the base station 2b, and transmits information indicating the measurement result (reception timing information) to the base station 2a and/or the base station 2b. It is assumed that the user apparatus 1 performs CA with a cell 3a corresponding to the base station 2a and a cell 3b corresponding to the base station 2b.

It should be noted that, in FIG. 11, "processing steps 1" indicate a case where the user apparatus 1 transmits the reception timing information to only a predetermined base station 2a, and "processing steps 2" indicate a case where the user apparatus 1 transmits the reception timing information to all of the base stations 2 included in DC-type CA. It should be noted that, in "processing steps 1", the user apparatus 1 may transmit the reception timing information to only a predetermined base station 2b.

In step S101, the signal transmission units 22 of the base station 2a and the base station 2b transmit radio signals to the user apparatus 1. In the radio signals, synchronization signals (PSS, SSS), PBCH, etc., are included. Further, the signal reception unit 11 of the user apparatus 1 recognizes a reception timing (symbol timing), an SFN, and a subframe number, and information for uniquely identifying a cell of each of radio signals transmitted from the base station 2a and the base station 2b based on the synchronization signals, the PBCHs, etc., transmitted from the base station 2a and the base station 2b.

In step S102, the reception timing measurement unit 13 of the user apparatus 1 measures the reception timing gap between the radio signal transmitted from the base station 2a and the radio signal transmitted from the base station 2b by comparing the reception timing (symbol timing), the SFN, and the subframe number of the radio signal transmitted from the base station 2a and the reception timing (symbol timing), the SFN, and the subframe number of the radio signal transmitted from the base station 2b.

In step S103, the reporting unit 14 of the user apparatus 1 transmits a reception timing information reporting signal including reception timing information indicating the reception timing gap measured in step S102 to the base station 2a via the signal transmission unit 12. It should be noted that the reception timing information reporting signal may be, for example, an RRC control signal, a MAC signal command, or physical channel control information.

In step S104, the base station 2a exchanges cooperation information with the base station 2b. The exchanging cooperation information may be performed by, for example, using an X2 interface or an interface used for OAM.

Step S105 and step S107 are the same as step S103 and step S104, respectively, and thus, the description will be omitted.

In step S106, the reporting unit 14 of the user apparatus 1 transmits the reception timing information reporting signal including reception timing information indicating the reception timing gap measured in step S102 to the base station 2b via the signal transmission unit 12. It should be noted that the reception timing information reporting signal may be, for example, an RRC control signal, a MAC signal command, or physical channel control information.

(Specific Example of Processing Steps (No. 1))

Next, contents of processing performed by the user apparatus 1 in step S102 and contents of reception timing information transmitted to the base stations 2 in step S103 or step S106 will be specifically described. Further, the DRX control operations performed by the base station 2a and the base station 2b after the processing steps illustrated in FIG. 11 are performed will be specifically described. It should be noted that, in the following description, it is assumed that the base station 2a corresponds to CC#1 and the base station 2b corresponds to CC#2. Further, in the following description, CC#1 may be a PCell or an SCell. Further, CC#2 may be a PSCell or an SCell.

Figure 12A:
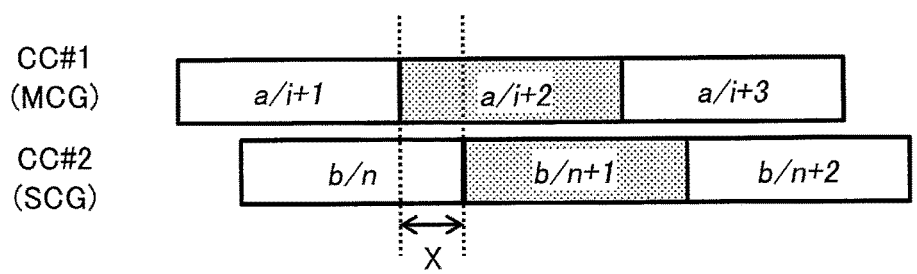
FIG. 12A is a drawing illustrating an example of a measurement method of a reception timing gap and reception timing information (No. 1).
Figure 12B:
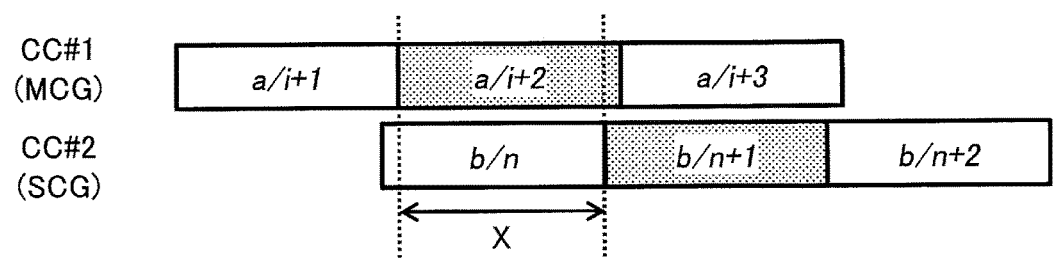
FIG. 12B is a drawing illustrating an example of a measurement method of a reception timing gap and reception timing information (No. 1).
Figure 13A:
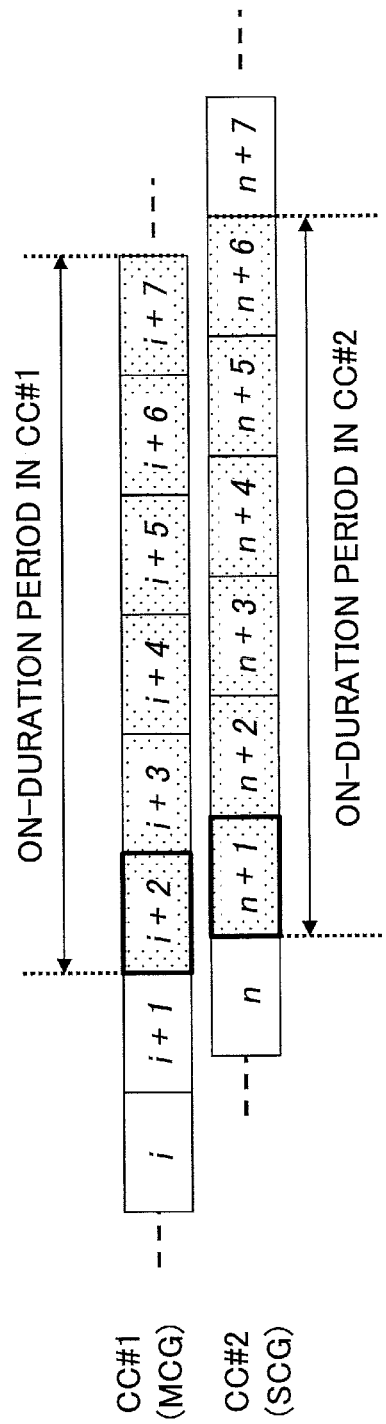
FIG. 13A is a drawing illustrating on-duration periods in a DRX control operation (No. 1).
Figure 13B:
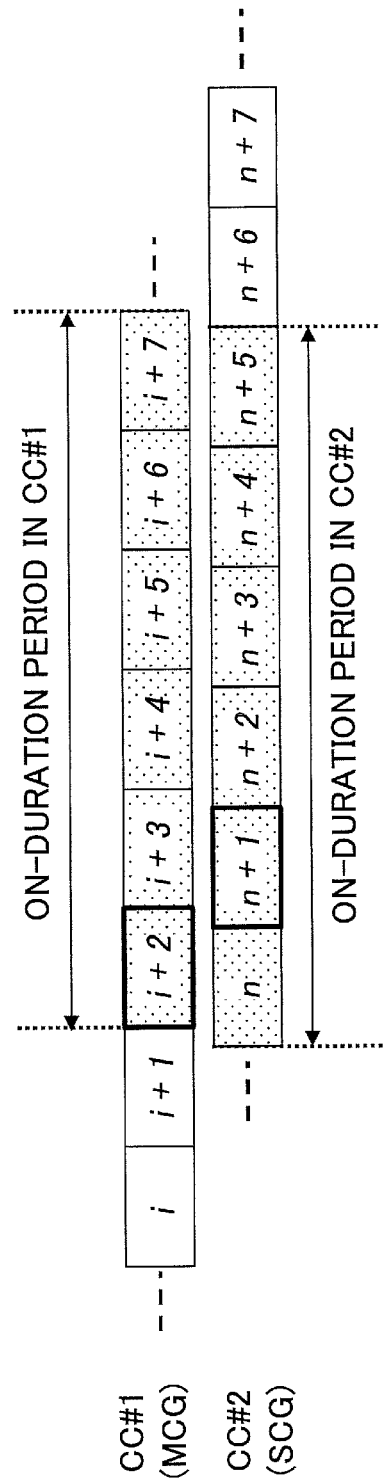
FIG. 13B is a drawing illustrating on-duration periods in a DRX control operation (No. 1).

FIG. 12A and FIG. 12B are drawings illustrating an example of a measurement method of a reception timing gap and reception timing information (No. 1). FIG. 13A and FIG. 13B are drawings illustrating on-duration periods in the DRX control operation (No. 1).

In FIG. 12A and FIG. 12B, "a" indicates an SFN in CC#1, and "i" indicates a subframe number in CC#1. In other words, subframes indicated by "a/i+1", "a/i+2", and "a/i+3" are three consecutive subframes in CC#1. Similarly, "b" indicates an SFN in CC#2, and "n" indicates a subframe number in CC#2. In other words, subframes indicated by "b/n", "b/n+1", and "b/n+2" are three consecutive subframes in CC#2. Similarly, in FIG. 13A and FIG. 13B, "i" indicates a subframe number in CC#1, and "n" indicates a subframe number in CC#2.

First, the reception timing measurement unit 13 selects any one of subframes in CC#1 and stores an SFN and a subframe number of the selected subframe. The selected subframe of CC#1 is a subframe which serves as a reference when the reception timing measurement unit 13 measures the reception timing gap. In examples of FIG. 12A and FIG. 12B, it is assumed that the reception timing measurement unit 13 selects the subframe "a/i+2".

Next, the reception timing measurement unit 13 selects a subframe of CC#2 whose starting point is located between the starting point and the ending point of the selected subframe of CC#1 (in examples of FIG. 12A and FIG. 12B, the subframe "a/i+2"), and stores the SFN and the subframe number of the subframe. In examples of FIG. 12A and FIG. 12B, the subframe "b/n+1" is selected.

Next, the reception timing measurement unit 13 measures a time gap "X" between the starting point of the selected subframe of CC#1 (in examples of FIG. 12A and FIG. 12B, the subframe "a/i+2") and the starting point of the selected subframe of CC#2 (in examples of FIG. 12A and FIG. 12B, the subframe "b/n+1"), and stores the measured value of X.

Next, the reporting unit 14 sets in the reception timing information the SFN of the selected subframe of CC#1 (in examples of FIG. 12A and FIG. 12B, the subframe "a/i+2"), the subframe number, and an identifier used for uniquely identifying CC#1, the SFN of the selected subframe of CC#2 (in examples of FIG. 12A and FIG. 12B, the subframe "b/n+2"), the subframe number, and an identifier used for uniquely identifying CC#2, and the measured value of X, and transmits the set result to the base station 2a and/or the base station 2b (step S103, S105, or S106 in FIG. 11).

It should be noted that the identifier used for uniquely identifying CC#1 and the identifier used for uniquely identifying CC#2 may be, for example, a CellIndex or another identifier. The identifiers may be any identifier as long as the base station 2 can use it for uniquely identifying the cell or CC included in CA.

It should be noted that FIG. 12A illustrates an example of a case in which a time gap (value of X) between the selected CC#1 subframe and the selected CC#2 subframe is less than the half of the subframe interval (0.5 ms), and FIG. 12B illustrates a case where the value of X is greater than the half of the subframe interval (0.5 ms).

In the case where the value of X is less than 0.5 ms, it is possible for the base station 2 to determine that equal to or more than half (0.5 ms) is overlapped between the CC#1 subframe and the CC#2 subframe reported by the reception timing information as illustrated in FIG. 12A.

In this case, for example, the DRX control unit 26 of the base station 2a may set the on-duration period by setting, as the starting point of the on-duration period, a subframe of the reported CC#1 subframe number in a radio frame after a predetermined number of radio frame periods (e.g., after Z periods) from the SFN of the reported CC#1 subframe. Similarly, the DRX control unit 26 of the base station 2a may set the on-duration period by setting, as the starting point of the on-duration period, a subframe of the reported CC#2 subframe number ("n+1") in a radio frame after the predetermined number of radio frame periods (after the same Z periods as CC#1) from the SFN of the reported CC#2 subframe. FIG. 13A illustrates a case where the on-duration periods are set as described above. It should be noted that the subframes indicated by thick frames illustrate subframes corresponding to the subframe numbers reported by the reception timing information.

On the other hand, in the case where the value of X is equal to or greater than 0.5 ms, it is possible for the base station 2 to determine that less than half (0.5 ms) is overlapped between the CC#1 subframe and the CC#2 subframe reported by the reception timing information as illustrated in FIG. 12B. In this case, for example, the DRX control unit 26 of the base station 2a may set the on-duration period by setting, as the starting point of the on-duration period, a subframe of the reported CC#1 subframe number in a radio frame after the predetermined number of radio frame periods (e.g., after Z periods) from the SFN of the reported CC#1 subframe. Similarly, the DRX control unit 26 of the base station 2b may set the on-duration period by setting, as the starting point of the on-duration period, a subframe ("n") which is one subframe before the reported subframe of CC#2 ("n+1") in a radio frame after the predetermined number of radio frame periods (after the same Z periods as CC#1) from the SFN of the reported CC#2 subframe. FIG. 13B illustrates a case where the on-duration periods are set as described above. It should be noted that the subframes indicated by thick frames illustrate subframes corresponding to the subframe numbers reported by the reception timing information.

It should be noted that the above specific example (No. 1) is an example of processing steps, and the processing steps are not limited to the above. Although the reception timing measurement unit 13 selects a CC#2 subframe whose starting point is between the starting point and the ending point of a reference CC#1 subframe, the reception timing measurement unit 13 may select a CC#2 subframe whose ending point is between the starting point and the ending point of the selected reference CC#1 subframe. Further, as another example, the reception timing measurement unit 13 may select a CC#2 subframe whose subframe number is the same as the reference subframe selected for CC#1, or, the reception timing measurement unit 13 may select a CC#2 subframe whose SFN and subframe number are the same as the reference subframe selected for CC#1.

In other words, any processing steps may be performed as long as the user apparatus 1 and the base station 2 share the same recognition about the selection criteria for the CC#1 subframe and the CC#2 subframe reported by the reception timing information and about which period the time gap is indicated by the time gap "X".

Further, as the time gap "X", for example, a specific time (e.g., micro second unit) may be set, a discretized value by using a predetermined number (e.g., 100 micro seconds) may be set, or an index number corresponding to a predetermined time gap may be set.

Further, in the case of measuring the time gap "X", the reception timing measurement unit 13 may compare the starting points of the selected CC#1 and CC#" subframes, or may compare the ending points. Further, positions of the predetermined symbol timings may be compared. The reception timing measurement unit 13 may measure the time gap "X" by using any method.

Further, instead of setting the SFN and the subframe number of the CC#2 subframe, the reporting unit 14 may set in the reception timing information a difference from the SFN of the CC#1 subframe (e.g., a value in which the SFN of CC#1 is subtracted from the SFN of CC#2) and a difference from the CC#1 subframe number (e.g., a value in which the CC#1 subframe number is subtracted from the CC#2 subframe number). Alternatively, instead of setting the SFN and the subframe number of the CC#1 subframe, the reporting unit 14 may set in the reception timing information a difference from the SFN of the CC#2 subframe (e.g., a value in which the CC#2 SFN is subtracted from the CC#1 SFN) and a difference from the CC#2 subframe number (e.g., a value in which the CC#2 subframe number is subtracted from the CC#1 subframe number). Further, instead of calculating differences of the SFN and the subframe number, the reporting unit 14 may calculate the differences by calculating the subtraction between values in which the SFN and the subframe number are consolidated, and may set the calculated subtraction result in the reception timing information.

It should be noted that the base station 2a and the base station 2b may exchange cooperation information based on the reception timing information reported by the user apparatus 1, and may perform various control operations for the user apparatus 1 based on the exchanged cooperation information.

The base station 2a and the base station 2b may perform measurement gap control operations based on the reception timing information reported by the user apparatus 1 according to the above processing steps or the exchanged cooperation information. For example, in the case where the scheduling control unit 27 of the base station 2a sets subframes "i+2" through "i+7" as a measurement gap period in CC#1 of FIG. 13A and FIG. 13B, the scheduling control unit 27 of the base station 2b may perform scheduling in such a way that, starting from a subframe ("n") one subframe before the reported CC#2 subframe ("n+1"), that is, subframes "n" through "n+6" of DL and UL radio resources will not be allocated.

(Specific Example of Processing Steps (Modified Example of No. 1))

In a specific example of processing steps (modified example of No. 1), the reception timing gap is measured according to the processing steps similar to the specific example of processing steps (No. 1), but the time gap "X" will not be included in the reception timing information. The things not specifically described in the following descriptions may be the same as those of the processing steps (No. 1).

First, the reception timing measurement unit 13 selects any one of subframes in CC#1 and stores an SFN and a subframe number of the selected subframe. The selected subframe of CC#1 is a subframe which serves as a reference when the reception timing measurement unit 13 measures the reception timing gap. In examples of FIG. 12A and FIG. 12B, it is assumed that the reception timing measurement unit 13 selects the subframe "a/i+2".

Next, the reception timing measurement unit 13 selects a subframe of CC#2 whose starting point is located between the starting point and the ending point of the selected subframe of CC#1 (in examples of FIG. 12A and FIG. 12B, the subframe "a/i+2"), and stores the SFN and the subframe number of the subframe. In examples of FIG. 12A and FIG. 12B, the subframe "b/n+1" is the subframe.

Next, the reporting unit 14 sets in the reception timing information the SFN of the selected subframe of CC#1 (in examples of FIG. 12A and FIG. 12B, the subframe "a/i+2"), the subframe number, and an identifier used for uniquely identifying CC#1, the SFN of the selected subframe of CC#2 (in examples of FIG. 12A and FIG. 12B, the subframe "b/n+1"), the subframe number, and an identifier used for uniquely identifying CC#2, and transmits the set result to the base station 2a and/or the base station 2b (step S103, S105, or S106 in FIG. 11).

In the specific example of processing steps (modified example of No. 1), the base station 2 cannot determine whether the gap of the subframes is in a state of FIG. 13A (i.e., the overlapped period of the reported subframes is greater than the half) or in a state of FIG. 13B (i.e., the overlapped period of the reported subframes is less than the half). Therefore, for example, the DRX control unit 26 of the base station 2b may set the on-duration period by setting, as the starting point of the on-duration period, a subframe of the reported CC#2 subframe number ("n+1") in a radio frame after the predetermined number of radio frame periods (after the same Z periods as CC#1) from the SFN of the reported CC#2 subframe. In other words, either in the case of FIG. 13A or in the case of FIG. 13B, the DRX control unit 26 of the base station 2b may set the subframes "n+1" through "n+6" as the on-duration period.

Further, the base station 2a and the base station 2b may perform measurement gap control operations based on the reception timing information reported by the user apparatus 1 according to the above processing steps or the exchanged cooperation information. For example, in the case where the scheduling control unit 27 of the base station 2a sets subframes "i+2" through "i+7" as a measurement gap period in CC#1 of FIG. 13A and FIG. 13B, the scheduling control unit 27 of the base station 2b may perform scheduling in such a way that, starting from a subframe ("n") one subframe before the reported CC#2 subframe ("n+1"), that is, subframes "n" through "n+6" of DL and UL radio resources will not be allocated.

It should be noted that the above specific example (modified example of No. 1) is an example of processing steps, and the processing steps are not limited to the above. Although the reception timing measurement unit 13 selects a CC#2 subframe whose starting point is between the starting point and the ending point of a reference CC#1 subframe, the reception timing measurement unit 13 may select a CC#2 subframe whose ending point is between the starting point and the ending point of the selected CC#1 reference subframe.

In this case, in controlling the measurement gap, for example, in the case where the scheduling control unit 27 of the base station 2a sets subframes "i+2" through "i+7" as a measurement gap period in CC#1 of FIG. 13A and FIG. 13B, the scheduling control unit 27 of the base station 2b may perform scheduling in such a way that, starting from a subframe of the reported CC#2 subframe number ("n"), that is, subframes "n" through "n+6" of DL and UL radio resources will not be allocated.

It should be noted that in the case where the difference of the before-or-after relationship between the starting points of the subframes of CC#1 and CC#2 is very small (e.g., in the case where the difference of the before-or-after relationship is equal to or less than a predetermined threshold value), the reception timing measurement unit 13 may select a CC#2 subframe whose period overlapped with the reference CC#1 subframe is the greatest and set the subframe in the reception timing information. Further, as the predetermined threshold value used for determining the before-or-after relationship difference, the reception timing measurement unit 13 may use, for example, the reception timing difference between the subframes of the CGs (e.g., PCell and PSCell) defined in the synchronized DC (in other words, the maximum DL reception timing difference, or, the maximum UL transmission timing difference). Further, the reporting unit 14 may include information indicating that the before-or-after relationship difference is very small in the reception timing information, and transmit the included result to the base station 2.

With the above arrangement, in the case where the before-or-after relationship difference is very small, it is possible for the base station 2a and the base station 2b to perform measurement gap control operations by using processing steps similar to, for example, a specific example of processing steps (No. 2) which will be described below.

(Specific Example of Processing Steps (No. 2))

Figure 14A:
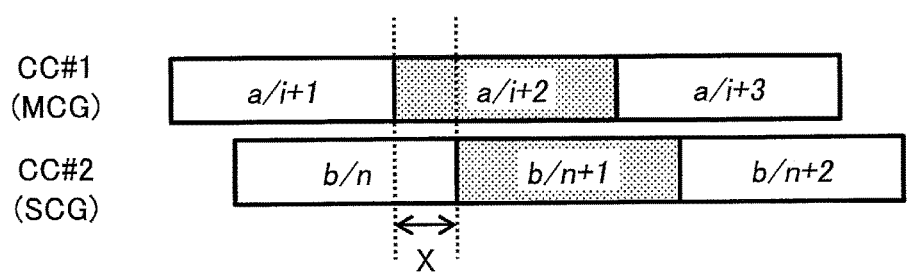
FIG. 14A is a drawing illustrating an example of a measurement method of a reception timing gap and reception timing information (No. 2).
Figure 14B:
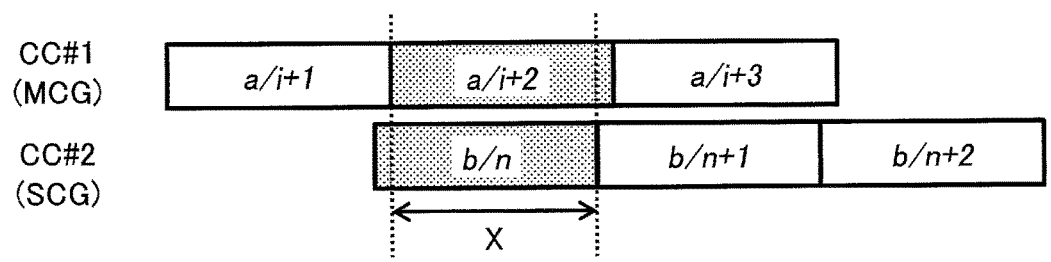
FIG. 14B is a drawing illustrating an example of a measurement method of a reception timing gap and reception timing information (No. 2).
Figure 15A:
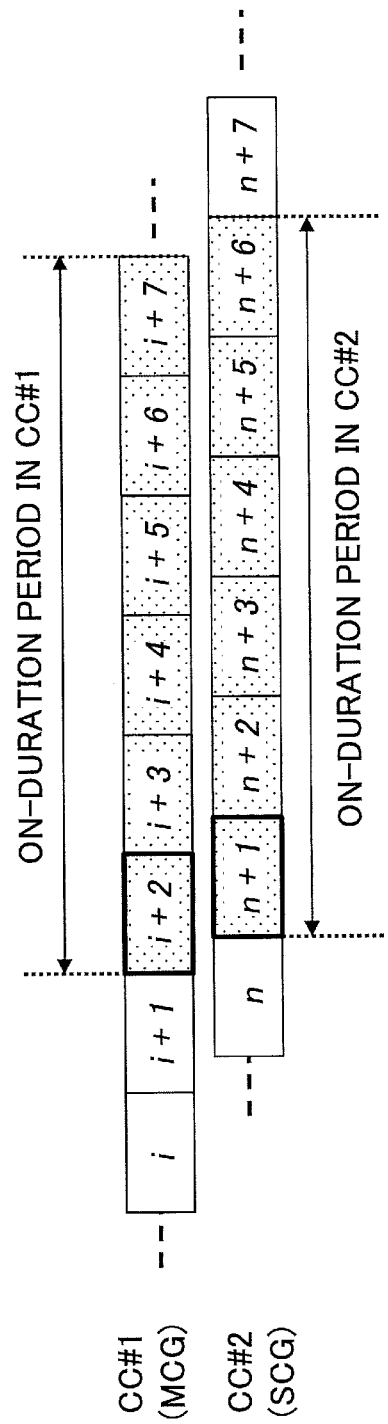
FIG. 15A is a drawing illustrating on-duration periods in a DRX control operation (No. 2).
Figure 15B:
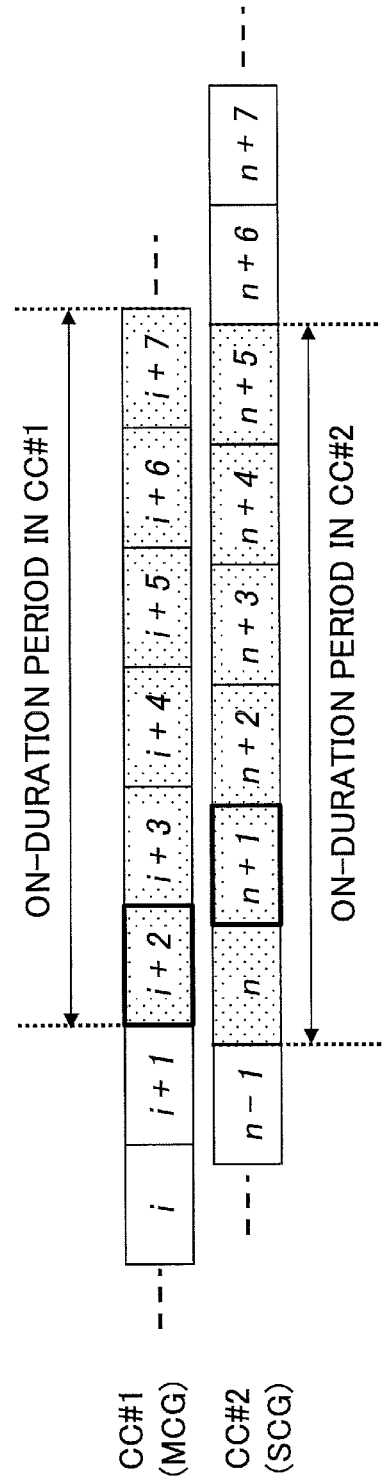
FIG. 15B is a drawing illustrating on-duration periods in a DRX control operation (No. 2).

FIG. 14A and FIG. 14B are drawings illustrating an example of a measurement method of the reception timing gap and reception timing information (No. 2). FIG. 15A and FIG. 15B are drawings illustrating on-duration periods in a DRX control operation (No. 2). The things not specifically described in the following descriptions may be the same as those of the processing steps (No. 1).

First, the reception timing measurement unit 13 selects any one of subframes in CC#1 and stores an SFN and a subframe number of the selected subframe. The selected subframe of CC#1 is a subframe which serves as a reference when the reception timing measurement unit 13 measures the reception timing gap. In examples of FIG. 14A and FIG. 14B, it is assumed that the reception timing measurement unit 13 selects a subframe "a/i+2".

Next, the reception timing measurement unit 13 selects a subframe of CC#2 whose starting point is located between the starting point and the ending point of the selected subframe of CC#1 (in examples of FIG. 14A and FIG. 14B, the subframe "a/i+2"), and stores the SFN and the subframe number of the subframe. In examples of FIG. 14A and FIG. 14B, a subframe "b/n+1" is the subframe.

Next, the reception timing measurement unit 13 measures the time gap "X" between the starting point of the selected subframe of CC#1 (in examples of FIG. 14A and FIG. 14B, the subframe "a/i+2") and the starting point of the selected subframe of CC#2 (in examples of FIG. 14A and FIG. 14B, the subframe "b/n+1"), and stores the measured value of X.

Next, in the case where the value of X is less than 0.5 ms, the reporting unit 14 sets in the reception timing information the SFN of the selected CC#1 subframe (in examples of FIG. 14A, the subframe "a/i+2"), the subframe number, and an identifier used for uniquely identifying CC#1, the SFN of the selected CC#2 subframe (in examples of FIG. 14A, the subframe "b/n+1"), the subframe number, and an identifier used for uniquely identifying CC#2, and transmits the set result to the base station 2a and/or the base station 2b.

Further, in the case where the value of X is equal to or greater than 0.5 ms, the reporting unit 14 sets in the reception timing information the SFN of the selected CC#1 subframe (in examples of FIG. 14A, the subframe "a/i+2"), the subframe number, and an identifier used for uniquely identifying CC#1, the SFN of a subframe one subframe before the selected CC#2 subframe (in examples of FIG. 14B, the subframe "b/n"), the subframe number, and an identifier used for uniquely identifying CC#2, and transmits the set result to the base station 2a and/or the base station 2b.

It should be noted that FIG. 14A illustrates an example of a case in which a time gap (value of X) between the selected CC#1 subframe and the selected CC#2 subframe is less than the half of the subframe interval (0.5 ms), and FIG. 14B illustrates a case where the value of X is equal to or greater than the half of the subframe interval (0.5 ms).

In the specific example of processing steps (No. 2), the base station 2 determines that equal to or greater than at least the half (equal to or greater than 0.5 ms) is overlapped between the CC#1 subframe and the CC#2 subframe reported by the reception timing information. The DRX control unit 26 of the base station 2a may set the on-duration period by setting, as the starting point of the on-duration period, a subframe of the reported CC#1 subframe number in a radio frame after the predetermined radio frame periods (e.g., after Z periods) from the SFN of the reported CC#1 subframe. Similarly, the DRX control unit 26 of the base station 2b may set the on-duration period by setting, as the starting point of the on-duration period, a subframe of the reported CC#2 subframe number ("n" or "n+1") in a radio frame after the predetermined radio frame periods (after the same Z periods as CC#1) from the SFN of the reported CC#2 subframe. FIG. 15A and FIG. 15B illustrate states of cases where the on-duration periods are set as described above. It should be noted that the subframes indicated by thick frames illustrate subframes corresponding to the subframe numbers reported by the reception timing information. FIG. 15A illustrates an example of a case where the value of X is less than 0.5 ms, and FIG. 15B illustrates an example of a case where the value of X is equal to or greater than 0.5 ms.

In the above-described specific example of processing steps (No. 2), different from the specific example of processing steps (No. 1), the reception timing information does not include the time gap "X". In other words, in the specific example of processing steps (No. 2), as compared with the specific example of processing steps (No. 1), a control signal (signaling signal) can be reduced.

It should be noted that, for example, instead of setting the SFN and the subframe number of the CC#2 subframe, the reporting unit 14 may set in the reception timing information a difference from the SFN of the CC#1 subframe (e.g., a value in which the CC#1 SFN is subtracted from the CC#2 SFN) and a difference from a number of the CC#1 subframe (e.g., a value in which the CC#1 subframe number is subtracted from the CC#2 subframe number). Alternatively, instead of setting the SFN and the subframe number of the CC#1 subframe, the reporting unit 14 may set in the reception timing information a difference from the SFN of the CC#2 subframe (e.g., a value in which the CC#2 SFN is subtracted from the CC#1 SFN) and a difference from a number of the CC#2 subframe (e.g., a value in which the CC#2 subframe number is subtracted from the CC#1 subframe number). Further, instead of calculating differences of the SFN and the subframe number, the reporting unit 14 may calculate the differences by calculating the subtraction between values in which the SFN and the subframe number are consolidated, and may set the calculated subtraction result in the reception timing information.

It should be noted that the base station 2a and the base station 2b may perform measurement gap control operations based on the reception timing information reported by the user apparatus 1 according to the above processing steps or the exchanged cooperation information. For example, in the case where the scheduling control unit 27 of the base station 2a sets, for example, subframes "i+2" through "i+7" as a measurement gap period in CC#1 of FIG. 15A and FIG. 15B, the scheduling control unit 27 of the base station 2b may perform, for example, scheduling in such a way that, eight frames starting from a subframe one subframe before the reported CC#2 subframe, that is, subframes "n" through "n+7" of DL and UL radio resources in FIG. 15A or subframes "n−1" through "n+6" of DL and UL radio resources in FIG. 15B, will not be allocated. It should be noted that the reason why the CC#2 subframe "n+7" is included in FIG. 15A and why the CC#2 subframe "n−1" is included in FIG. 15B is because it is not known by the base station 2 whether the starting point of the CC#2 subframe set in the reception timing information reported by the user apparatus 1 is before or after the starting point of the CC#1 subframe (in other words, whether the state corresponds to FIG. 15A or FIG. 15B).

(Specific Example of Processing Steps (Modified Example of No. 2))

As described above, in the specific example of processing steps (No. 2), the base station 2 cannot determine the before-or-after relationship between the starting point of the CC#1 subframe and the starting point of the CC#2 subframe, which subframes are set in the reception timing information reported by the user apparatus 1.

Therefore, the reporting unit 14 of the user apparatus 1 adds to the reception timing information information indicating the before-or-after relationship between the starting point of the CC#1 subframe and the starting point of the CC#2 subframe. The information may be, for example, information of a bit in which a state of FIG. 14A is indicated by "0" and a state of FIG. 14B is indicated by "1", or information of a bit in which a state of FIG. 14A is indicated by "1" and a state of FIG. 14B is indicated by "0". Further, in the case where the before-or-after relationship difference between the starting points of the CC#1 and CC#2 subframes (e.g., in the case where the before-or-after relationship difference is equal to or less than a predetermined threshold value), the reception timing measurement unit 13 or the reporting unit 14 of the user apparatus 1 may not strictly determine the before-or-after relationship, and may fixedly select the state of the before-or-after relationship of FIG. 14A or the state of FIG. 14B. Further, the reporting unit 14 may not transmit the information indicating the before-or-after relationship in order to implicitly indicate that the before-or-after relationship difference is very small.

The base station 2a and the base station 2b may perform measurement gap control operations based on the reception timing information reported by the user apparatus 1 according to the above processing steps or the exchanged cooperation information. For example, in the case where the scheduling control unit 27 of the base station 2a sets subframes "i+2" through "i+7" as a measurement gap period in CC#1 of FIG. 15A and FIG. 15B, the scheduling control unit 27 of the base station 2b may perform scheduling in CC#2 in such a way that, starting from a subframe ("n") one subframe before the reported CC#2 subframe ("n+1"), that is, subframes of "n" through "n+5" of DL and UL radio resources will not be allocated in the case of FIG. 15B. Further, in the case of FIG. 15A, the scheduling control unit 27 of the base station 2b may perform scheduling in CC#2 in such a way that, starting from the reported CC#2 subframe ("n+1"), that is, subframes "n+1" through "n+6" of DL and UL radio resources will not be allocated. As described above, because the reception timing information includes information indicating the before-or-after relationship between the starting point of the CC#1 subframe and the starting point of the CC#2 subframe, the scheduling control unit 27 of the base station 2b can determine whether the subframe gap is in a state of FIG. 15A or a state of FIG. 15B.

(Regarding Measurement Error in User Apparatus)

The reception timing measurement unit 13 of the user apparatus 1 measures a time gap between the CC#1 subframe and the CC#2 subframe. Actually, however, there is a possibility that a measurement error occurs. For example, in the case where the value of the time gap "X" is close to 0.5 ms, it is expected that an error occurs in reception timing information reported to the base station 2.

Figure 16:
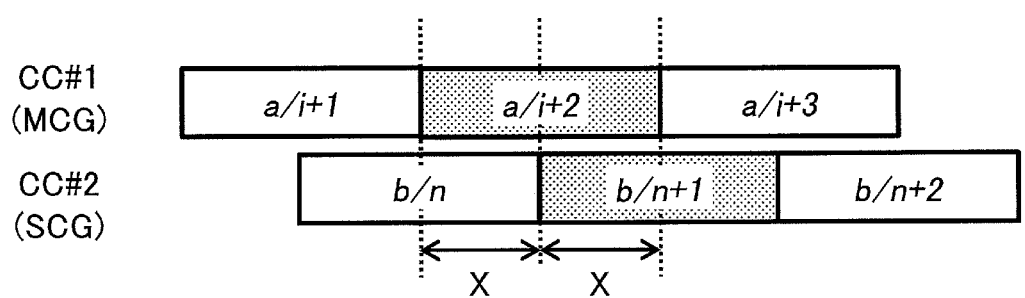
FIG. 16 is a drawing illustrating a measurement error in the user apparatus.

FIG. 16 is a drawing illustrating a measurement error in the user apparatus 1. For example, as illustrated in FIG. 16, in the case where the staring point of the CC#2 subframe exists almost at the center of the CC#1 subframe (in other words, in the case where the value of X is almost 0.5 ms), even if the user apparatus 1 determines that the reception timing gap is in a state of FIG. 12A or FIG. 14A, it is expected that the actual reception timing gap is in a state of FIG. 12B or FIG. 14B. In this case, incorrect reception timing information is reported to the base station 2.

Therefore, in the case where the value of the time gap "X" is in a range of a predetermined threshold value, the reporting unit 14 may include in the reception timing information, information indicating that there is a possibility that the incorrect state may be reported due to a measurement error, and transmit the included information to the base station 2.

Further, the predetermined threshold value may be stored in the user apparatus 1 in advance, or may be transmitted from the base station 2 to the user apparatus 1 by using broadcast information or system information.

With the above arrangement, when performing the DRX control operations or measurement gap control operations, it is possible for the base station 2 to determine that there is a possibility that the reception timing information reported from the user apparatus 1 includes a measurement error, and to perform control operations taking into account that the measurement error is included in the reception timing information.

Effect

As described above, a user apparatus according to an embodiment communicating with a first base station and a second base station in a communication system which supports carrier aggregation is provided. The user apparatus includes a measurement unit configured to measure a timing gap between a reception timing of a first radio signal received from the first base station and a reception timing of a second radio signal received from the second base station; and a transmission unit configured to transmit the information indicating the timing gap measured by the measurement unit to the first base station or the second base station.

According to the user apparatus 1 described above, a technique is provided in which the user apparatus 1 detects the gap of the subframes of radio signals transmitted from multiple base stations 2, and transmits the detected gap to the base stations 2.

Further, the measurement unit determines whether the timing gap is included in a predetermined threshold value, and in the case where the timing gap is included in the predetermined threshold value, the transmission unit may transmit information indicating that the timing gap is included in the predetermined threshold value to the first base station or the second base station.

With the above arrangement, it is possible for the base station 2 to determine that there is a possibility that the reception timing information reported from the user apparatus 1 includes a measurement error, and to perform various control operations taking into account that the measurement error is included in the reception timing information.

Further, the information indicating the timing gap may include a system frame number and a subframe number of a subframe included in the first radio signal; and a system frame number and a subframe number of a subframe included in the second radio signal.

With the above arrangement, it is possible for the base station 2 to identify the reception timing gap in subframes. Further, with the above arrangement, it is possible for the base stations 2 included in DC-type CA to cooperatively perform DRX control operations or measurement gap control operations, it is possible for the user apparatus 1 to reduce energy consumption, and it is possible to prevent radio resources from being wastefully allocated during a period (measurement gap period) in which the user apparatus 1 cannot perform communications.

Further, the information indicating the timing gap may further include information indicating a time difference between a predefined measurement timing of a subframe included in the first radio signal and a predefined measurement timing of a subframe included in the second radio signal.

With the above arrangement, it is possible for the base station 2 to identify in detail the reception timing gap between the subframes of CCs. Further, with the above arrangement, is is possible to reduce energy consumption of the user apparatus 1, and it is possible to prevent the radio resources from being wastefully allocated during a period in which the user apparatus 1 cannot perform communications.

Further, the measurement unit may measure the timing gap by comparing the predefined measurement timing of the subframe included in the first radio signal and the predefined measurement timing of the subframe included in the second radio signal.

Further, the predefined measurement timing may be a starting timing of the subframe, an intermediate timing between the starting timing and an ending timing of the subframe, or the ending timing of the subframe.

With the above arrangement, is is possible for the user apparatus 1 to measure the subframe reception timing gap between CCs by using various measurement timings.

Further, according to an embodiment, a base station communicating with a user apparatus in a communication system which supports carrier aggregation is provided. The base station includes a reception unit configured to receive information indicating a timing gap between a reception timing of a first radio signal transmitted from the base station and a reception timing of a second radio signal transmitted from another base station different from the base station; and a control unit configured to control the user apparatus based on the information indicating the timing gap.

According to the base station 2 described above, a technique is provided in which the user apparatus 1 detects the gap of the subframes of radio signals transmitted from multiple base stations 2, and transmits the detected gap to the base stations 2.

Further, the control unit may indicate the scheduling of the radio resources for the user apparatus 1 or may indicate a discontinuous reception timing to the user apparatus 1.

With the above arrangement, it is possible for the base stations 2 included in DC-type CA to cooperatively perform DRX control operations or measurement gap control operations, it is possible for the user apparatus 1 to reduce energy consumption, and it is possible to prevent radio resources from being wastefully allocated during a period in which the user apparatus 1 cannot perform communications.

Supplementary Description of Embodiment

As described above, embodiments have been described. The disclosed invention is not limited to these embodiments, and a person skilled in the art would understand various variations, modifications, replacements, or the like. Specific examples of numerical values have been used for encouraging understanding of the present invention. These numeric values are merely examples and, unless otherwise noted, any appropriate values may be used. In the above description, partitioning of items is not essential to the present invention. Matters described in more than two items may be combined if necessary. Matters described in one item may be applied to matters described in another item (as long as they do not conflict). In a functional block diagram, boundaries of functional units or processing units do not necessarily correspond to physical boundaries of parts. Operations of multiple functional units may be physically performed in a single part, or operations of a single functional unit may be physically performed by multiple parts. The order of steps in the above described sequences and flowcharts according to an embodiment may be changed as long as there is no contradiction. For the sake of description convenience, the user apparatus 1 and the base station 2 have been described by using functional block diagrams. These apparatuses may be implemented by hardware, by software, or by combination of both. The software which is executed by a processor included in a user apparatus 1 according to an embodiment and the software which is executed by a processor included in a base station 2 may be stored in a random access memory (RAM), a flash memory, a read-only memory (ROM), an EPROM, an EEPROM, a register, a hard disk drive (HDD), a removable disk, a CD-ROM, a database, a server, or any other appropriate recording medium.

The present invention is not limited to the above embodiments and various variations, modifications, alternatives, replacements, etc., may be included in the present invention without departing from the spirit of the invention.

It should be noted that, in an embodiment, the reception timing measurement unit 13 is an example of a measurement unit. The reporting unit 14 and the signal transmission unit 12 are examples of a transmission unit. The reception timing information or the cooperation information is an example of information indicating the timing gap. The signal reception unit 21 and the cooperation information exchange unit 24 are examples of a reception unit. The DRX control unit 26 or the scheduling control unit 27 is an example of a control unit.

The present application is based on and claims the benefit of priority of Japanese Priority Application No. 2015-077225 filed on Apr. 3, 2015, the entire contents of which are hereby incorporated by reference.

DESCRIPTION OF THE REFERENCE NUMERALS

1 User apparatus
2 Base station
3 Cell
11 Signal reception unit
12 Signal transmission unit
13 Reception timing measurement unit
14 Reporting unit
21 Signal reception unit
22 Signal transmission unit
23 inter-base-station communication unit
24 Cooperation information exchange unit
25 Storage unit
26 DRX control unit
27 Scheduling control unit
101 RE module
102 BB processing module
103 Apparatus control module
104 SIM slot
201 RE module
202 BB processing module
203 Apparatus control module
204 Communication IF

What is claimed is:

1. A user apparatus in a communication system, the user apparatus comprising:
a transmission unit that communicates with a first base station and a second base station using carrier aggregation; and
a measurement unit configured to measure a timing gap between a reception timing of a first radio signal received from the first base station and a reception timing of a second radio signal received from the second base station,
wherein the transmission unit transmits information indicating the timing gap to the first base station or the second base station, and
wherein the information indicating the timing gap includes a discretized value or an index number corresponding to a predetermined time gap.

2. The user apparatus according to claim 1, wherein the measurement unit determines whether the timing gap is within a predetermined threshold value, and in the case where the timing gap is within the predetermined threshold value, the transmission unit transmits information indicating that the timing gap is within the predetermined threshold value to the first base station or the second base station.

3. The user apparatus according to claim 2, wherein the information indicating the timing gap includes a difference between an SFN of the first radio signal and an SFN of the second radio signal and a difference between a subframe number included in the first radio signal and a subframe number included in the second radio signal.

4. The user apparatus according to claim 2, wherein the measurement unit measures the timing gap by comparing the predefined measurement timing of the subframe included in the first radio signal and the predefined measurement timing of the subframe included in the second radio signal.

5. The user apparatus according to claim 2, wherein the communication system supports dual connectivity.

6. The user apparatus according to claim 1, wherein the information indicating the timing gap includes a difference between a System Frame Number (SFN) of the first radio signal and a SFN of the second radio signal and a difference between a subframe number included in the first radio signal and a subframe number included in the second radio signal.

7. The user apparatus according to claim 6, wherein the information indicating the timing gap further includes information indicating a time difference between a predefined measurement timing of the subframe included in the first radio signal and a predefined measurement timing of the subframe included in the second radio signal.

8. The user apparatus according to claim 7, wherein the measurement unit measures the timing gap by comparing the predefined measurement timing of the subframe included in the first radio signal and the predefined measurement timing of the subframe included in the second radio signal.

9. The user apparatus according to claim 7, wherein the communication system supports dual connectivity.

10. The user apparatus according to claim 6, wherein the measurement unit measures the timing gap by comparing the predefined measurement timing of the subframe included in the first radio signal and the predefined measurement timing of the subframe included in the second radio signal.

11. The user apparatus according to claim 6, wherein the communication system supports dual connectivity.

12. The user apparatus according to claim 1, wherein the measurement unit measures the timing gap by comparing the predefined measurement timing of the subframe included in the first radio signal and the predefined measurement timing of the subframe included in the second radio signal.

13. The user apparatus according to claim 12, wherein the predefined measurement timing is a starting timing of the subframe, an intermediate timing between the starting timing and an ending timing of the subframe, or the ending timing of the subframe.

14. The user apparatus according to claim 13, wherein the communication system supports dual connectivity.

15. The user apparatus according to claim 12, wherein the communication system supports dual connectivity.

16. The user apparatus according to claim 1, wherein the communication system supports dual connectivity.

17. A base station comprising:
a reception unit that receives, from a user apparatus information indicating a timing gap between a reception timing of a first radio signal transmitted from the base station and a reception timing of a second radio signal transmitted from another base station different from the base station; and
a control unit that controls the user apparatus based on the information indicating the timing gap,
wherein the information indicating the timing gap includes a discretized value or an index number corresponding to a predetermined time gap, and
wherein the user apparatus communicates with the base station and the another base station using carrier aggregation.

18. The base station according to claim 17, wherein the control unit schedules radio resources for the user apparatus or indicates a discontinuous reception timing to the user apparatus based on the information indicating the timing gap.

* * * * *